United States Patent
Ogata et al.

(10) Patent No.: US 7,092,019 B1
(45) Date of Patent: Aug. 15, 2006

(54) IMAGE CAPTURING APPARATUS AND METHOD THEREFOR

(75) Inventors: Masami Ogata, Kanagawa (JP); Takashi Tsuchiya, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 09/580,166

(22) Filed: May 30, 2000

(30) Foreign Application Priority Data

May 31, 1999 (JP) .............................. P11-152808

(51) Int. Cl.
*H04N 9/093* (2006.01)

(52) U.S. Cl. .................... 348/263; 348/222.1; 382/294

(58) Field of Classification Search ................ 348/362, 348/208.99, 208.1, 208.4, 208.6, 208.12; 382/294, 216, 217, 218
See application file for complete search history.

(56) References Cited

U.S. PATENT DOCUMENTS 5,905,527 A * 5/1999 Inou et al. ............. 348/207.99

2001/0028741 A1* 10/2001 Fahraeus et al. ............ 382/216
2003/0133035 A1* 7/2003 Hatano ........................ 348/362

* cited by examiner

*Primary Examiner*—David Ometz
*Assistant Examiner*—Yogesh Aggarwal
(74) *Attorney, Agent, or Firm*—Sonnenschein Nath & Rosenthal LLP

(57) ABSTRACT

An image capturing apparatus and a method therefor are proposed for the production of a natural composite image corresponding to an object to be imaged. A misregistration amount (d) of each image (xS1) except for a reference image (xL1) is detected with respect to the reference image, misregistration of each image except for the reference image with respect to the reference image is corrected on the basis of the misregistration amount, and then the reference image and each misregistration corrected image (xS4) except for the reference image are composed, thereby making it possible to avoid a degraded image quality which would otherwise be produced when a plurality of images are composed without correction, and consequently produce a natural composite image corresponding to an object to be imaged.

12 Claims, 25 Drawing Sheets

| R | G | R | G |
|---|---|---|---|
| G | B | G | B |
| R | G | R | G |
| G | B | G | B |

R: Red
G: Green
B: Blue

FIG. 3A (RELATED ART) LONG TIME EXPOSED IMAGE

FIG. 3B (RELATED ART) SHORT TIME EXPOSED IMAGE

FIG. 3C (RELATED ART) COMPOSITE TIME

FEATURE POINT IMAGE pL1

FEATURE POINT IMAGE pS1

| | $x(i+1, j) \geq 0$ AND $x(i-1, j) < 0$ | $x(i-1, j) \geq 0$ AND $x(i+1, j) < 0$ |
|---|---|---|
| $x(i, j+1) \geq 0$ AND $x(i, j-1) < 0$ | FEATURE POINT p1 | FEATURE POINT p2 |
| $x(i, j-1) \geq 0$ AND $x(i, j+1) < 0$ | FEATURE POINT p3 | FEATURE POINT p4 |

FIG. 17

| | | i | | |
|---|---|---|---|---|
| Ye | Cy | Ye | Cy | |
| Mg | G | Mg | G | |
| Ye | Cy | Ye | Cy | |
| G | Mg | G | Mg | |

LONG TIME EXPOSED IMAGE xL

| | | i-dx | | |
|---|---|---|---|---|
| Ye | Cy | Ye | Cy | |
| Mg | G | Mg | G | j-dy |
| Ye | Cy | Ye | Cy | |
| G | Mg | G | Mg | |

SHORT TIME EXPOSED IMAGE xS

IMAGE CAPTURING APPARATUS AND METHOD THEREFOR

BACKGROUND OF THE INVENTION

1. Field of the Invention

This invention relates to an image capturing apparatus and a method therefor, and more particularly, is suitably applied, for example, to a video camera.

2. Description of the Related Art

Conventionally, there is a video camera which composes a plurality of images captured with different amounts of exposure to produce an image having a wide dynamic range (i.e., an image which represents from a light region to a dark region).

A method of capturing a plurality of images with different amounts of exposure as mentioned may employ, as an imager device, a solid-state imager device (CCD: Charge Coupled Device), and involves adjusting an electronic shutter, which is a function possessed by the CCD, to change the exposure time to capture a plurality of images in a time division manner. In this method, a charge is accumulated and read in an arbitrary field period in a manner similar to a normal imaging operation, and subsequently a charge is again accumulated and read utilizing a vertical blanking period to capture two different images with different exposure times within one field period.

Also, as illustrated in FIG. 1, another method utilizes Neutral Density (ND) filters 3 having different transmittivities placed on respective pixels of an imager device 1 to capture an image which is spatially divided into segments having different amounts of exposure. Further, as illustrated in FIG. 2, another method involves providing a plurality of imager devices 5A, 5B, and capturing a plurality of images without reducing the spatial resolution by disposing ND filters in front of the respective imager devices, for example, placing an ND filter 7 in front of the imager device 5B, to give different transmittivities.

The method of capturing a plurality of images having different amounts of exposure in a time division manner is capable of producing an image of higher resolution as compared with the method of capturing a plurality of images having different exposure amounts in a spatial division manner, and is simpler in structure and lower in cost as compared with the method of capturing a plurality of images having different amounts of exposure using a plurality of imager devices. It can therefore be said that this image capturing method is better than the other two.

However, since the method of capturing a plurality of images having different amounts of exposure in a time division manner captures respective images having different amounts of exposure at different times, misregistration between the respective images, if caused by unintended movements of hands or the like, would result in a problem of a degraded image quality on a resulting composite image produced by composing the captured images having different amounts of exposure due to the misregistration on the composite image.

Referring now to FIGS. 3A and 3B, explanation will be given, of how such misregistration between respective images causes a degraded image quality of a composite image. FIG. 3A one-dimensionally shows an image captured with long time exposure; and FIG. 3B one-dimensionally shows an image captured with short time exposure, where misregistration equal to a length D occurs between the two images. When these two images are composed, disturbed image portions will be produced near the edges, as a composite image shown in FIG. 3C.

SUMMARY OF THE INVENTION

In view of the foregoing, an object of this invention is to provide an image capturing apparatus and a method therefor which are capable of producing a natural composite image corresponding to an object to be imaged.

The foregoing object and other objects of the invention have been achieved by the provision of an image capturing apparatus for capturing a plurality of images with different amounts of exposure to compose the images into a single composite image, comprising misregistration amount detecting means for detecting the amounts of misregistration of respective images except for a reference image, wherein the reference image is selected from the plurality of images, with respect to the reference image, misregistration correcting means for correcting misregistration of the respective images except for the reference image with respect to the reference image based on the misregistration amounts, and image composing means for composing the reference image and all of the respective misregistration corrected images except for the reference images.

A misregistration amount of each of the images except for the reference image is detected with respect to the reference image, misregistration of each of the images except for the reference image with respect to the reference image is corrected on the basis of the misregistration amount, and then the reference image and the respective misregistration corrected images except for the reference image are composed, thereby making it possible to avoid a degraded image quality which would otherwise be produced when a plurality of images are composed without correction.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 17 is a schematic diagram used for explaining the classification of zero-cross points;

DEAILED DESCRIPTION OF THE EMBODIMENT

Preferred embodiments of this invention will be described with reference to the accompanying drawings:

(1) First Embodiment

Figure 4:
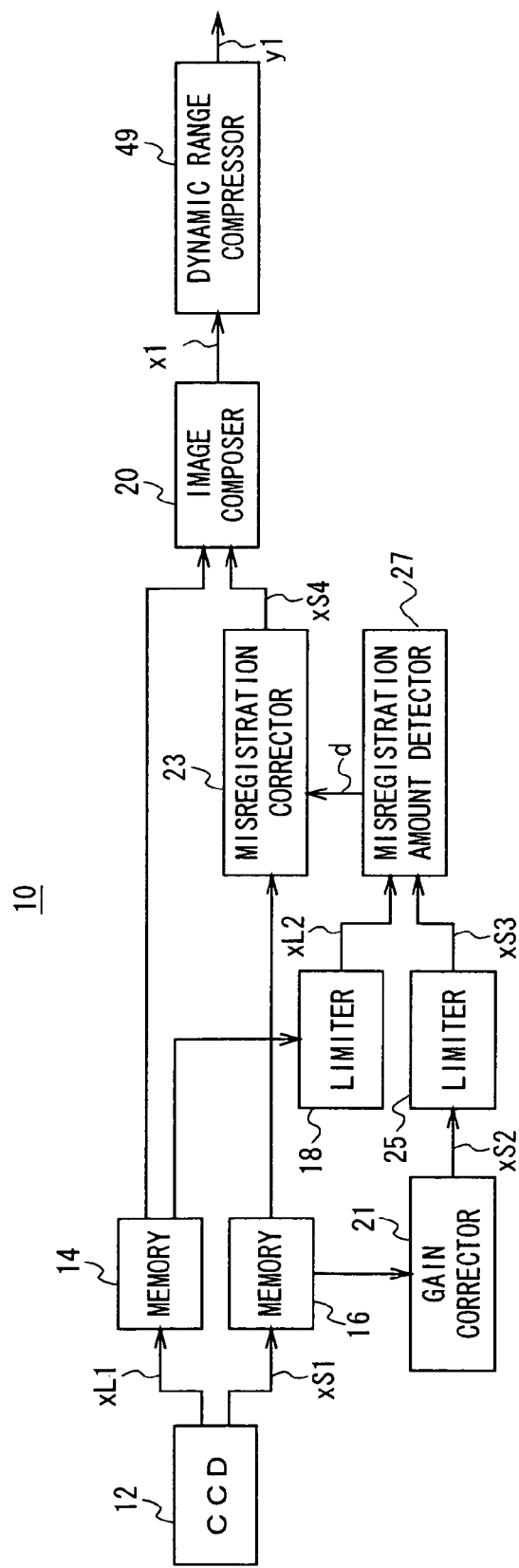
FIG. 4 is a block diagram illustrating the configuration of a video camera according to a first embodiment of the present invention.
Figure 5:
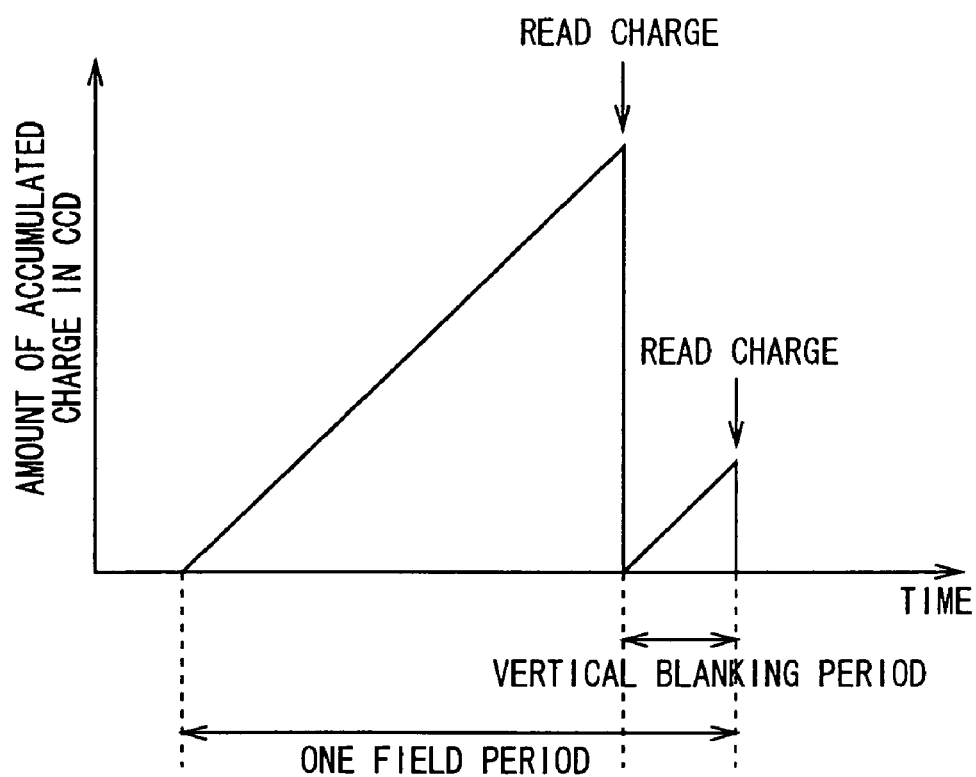
FIG. 5 is a schematic diagram used for explaining how the amount of exposure is controlled in a time division manner.

In FIG. 4, a video camera, the configuration of which is generally designated by reference numeral 10, is adapted to capture two images having different amounts of exposure in a time division manner by use of a solid-state imager device (CCD: Charge Coupled Device) 12. As shown in FIG. 5, the CCD 12 accumulates and reads a charge in an arbitrary field period, in a manner similar to normal imaging, and subsequently accumulates and reads a charge again utilizing a vertical blanking period, to produce two images with different times of exposure within one field period. In this way, the CCD 12 produces two images with different times of exposure, i.e., a long time exposed image xL1 and a short time exposed image xS1, and sends the long time exposed image xL1 to a memory 14, and sends the short time exposed image xS1 to a memory 16.

The memory 14 temporarily stores the long time exposed image xL1, and reads the long time exposed image xL1 at a predetermined timing to send it to a limiter 18 and an image composer 20, respectively. The memory 16 temporarily stores the short time exposed image xS1, and reads the short time exposed image xS1 at a predetermined timing to send it to a gain corrector 21 and a misregistration corrector 23, respectively.

The gain corrector 21 corrects the short time exposed image xS1 for a difference in the amount of exposure with the long time exposed image xL1 at the time of imaging in accordance with the following equation:

$$xS2(i, j) = xS1(i, j) \times g \quad (1)$$

Then, the gain corrector 21 sends a resulting short time exposed image xS2 to a limiter 25. In the above equation, g is the ratio of exposure times between the long time exposed image xL1 and the short time exposed image xS1 at the time of imaging, and is given by the following equation:

$$g = \frac{T_{long}}{T_{short}} \quad (2)$$

where $T_{long}$ is an exposure time for the long time exposure, and $T_{short}$ is an exposure time for the short time exposure. For reference, $xS1(i, j)$ represents the value of a pixel at a position (i, j) on the short time exposed image xS1.

The limiter 25 is provided for defining an upper limit for each pixel value on the short time exposed image xS2 which has been subjected to a gain correction. As given by the following equation:

$$xS3(i, j) = \begin{cases} xS2(i, j) & \ldots xS2(i, j) \leq T_{up} \\ T_{up} & \ldots xS2(i, j) > T_{up} \end{cases} \quad (3)$$

within respective pixels forming the short time exposed image xS2, a pixel value equal to or lower than a predetermined threshold value is outputted as it is, while a pixel value exceeding the predetermined threshold value is replaced with the threshold value $T_{up}$ which is outputted in place to produce a short time exposed image xS3 which is then sent to a misregistration amount detector 27.

The limiter 18 in turn is provided for defining an upper limit for each pixel value on the long time exposed image xL1. As is the case with the limiter 25, within respective pixels forming the long time exposed image xL1, a pixel value equal to or lower than a predetermined threshold value is outputted as it is, while a pixel value exceeding the predetermined threshold value is replaced with the threshold value $T_{up}$ which is outputted in place to produce a long time exposed image xL2 which is then sent to a misregistration amount detector 27.

Figure 6:
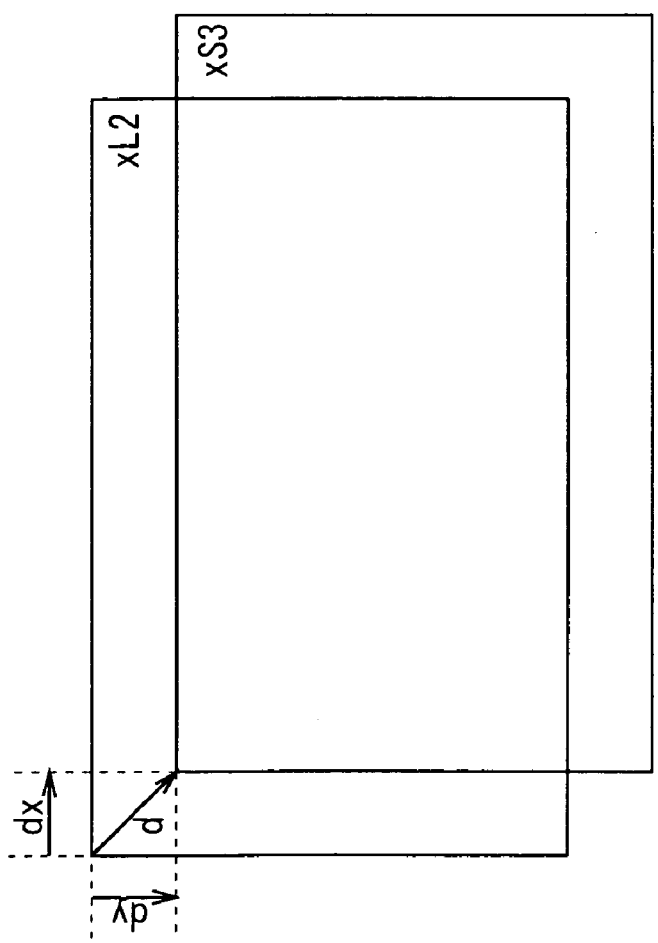
FIG. 6 is a schematic diagram used for explaining misregistration between images.

As shown in FIG. 6, the misregistration amount detector 27 detects the amount of misregistration between the long time exposed image xL2 and the short time exposed image xS3 as a two-dimensional vector d=(dx,dy) which is sent to the misregistration corrector 23. Here, dx represents a horizontal component of the amount of misregistration; and dy a vertical component of the same.

Figure 7:
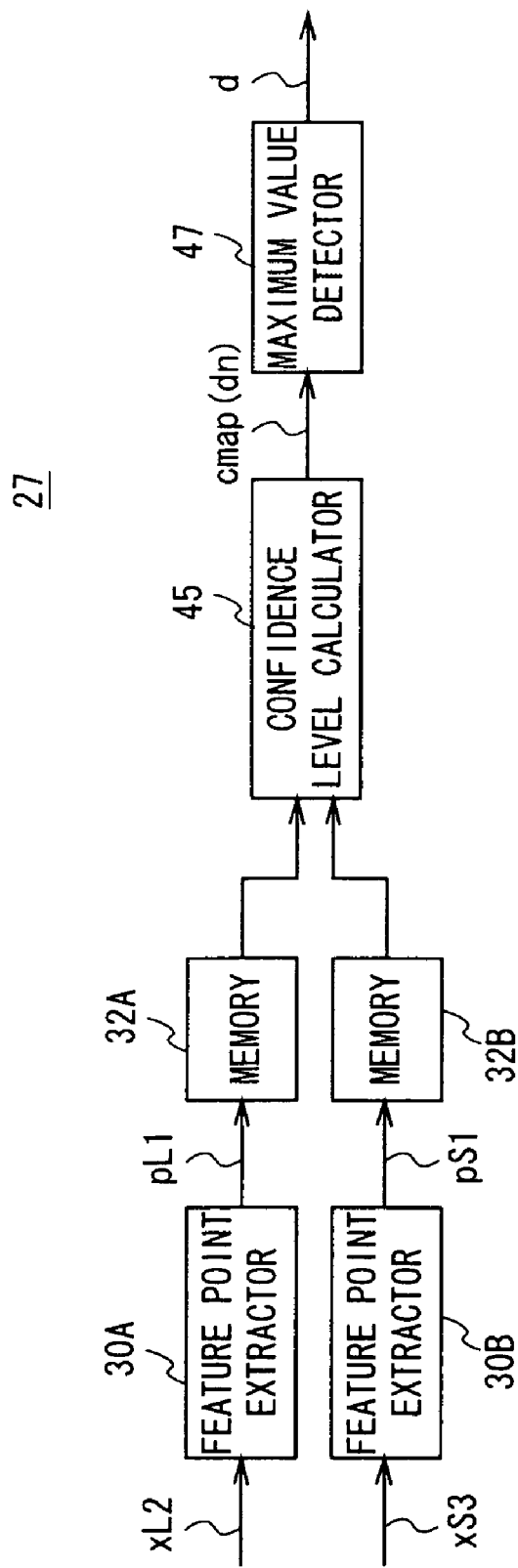
FIG. 7 is a block diagram illustrating the configuration of misregistration amount detector.

As illustrated in FIG. 7, the misregistration amount detector 27 inputs the long time exposed image xL2 supplied from the limiter 18 to a feature point extractor 30A, and inputs the short time exposed image xS3 supplied from the limiter 25 to a feature point extractor 30B. The feature point extractor 30A extracts feature points from the long time exposed image xL2 to produce a feature point image pL1 which is sent to a memory 32A. The feature point image pL1 is a binary image in which each pixel has a value "0" or "1," with the pixel value "1" indicating that a corresponding pixel on the long time exposed image xL2 is a feature point, and the pixel value "0" indicating that a corresponding pixel is not a feature point. Employed herein as the feature point is, for example, an edge point at which a spatially abrupt change is present within the long time exposed image xL2.

Similarly, the feature point extractor 30B extracts feature points from the short time exposed image xS3 to produce a feature point image pS1 which is sent to a memory 32B. Similar to the feature point image pL1, the feature point image pS1 is a binary image in which each pixel has a value "0" or "1," with the pixel value "1" indicating that a corresponding pixel on the long time exposed image xS3 is a feature point, and the pixel value "0" indicating that a corresponding pixel is not a feature point.

Figure 8:
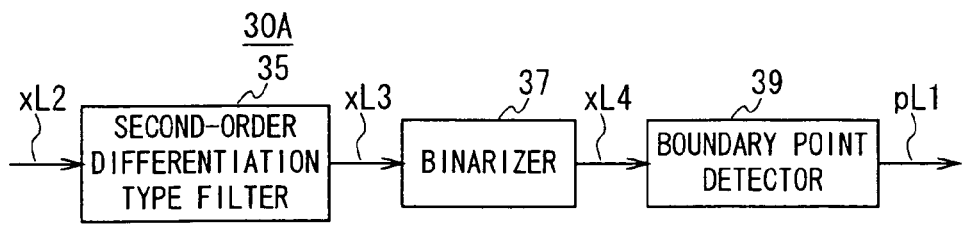
FIG. 8 is a block diagram illustrating the configuration of a feature point extractor.

The feature point extractors 30A, 30B are similar in configuration, so that the feature point extractor 30A will only be described herein with respect to the circuit configuration with reference to FIG. 8. The feature point extractor 30A inputs the long time exposed image xL2 supplied from the limiter 18 (FIG. 4) to a second-order differentiation type filter 35. The second-order differentiation type filter 35 employs, for example, the following equation referred to as Laplacian G:

$$\nabla^2 G(h, k) = \frac{-1}{\pi\sigma^2}\left[1 - \frac{h^2 + k^2}{2\sigma^2}\right]e^{-\frac{h^2+k^2}{2\sigma^2}} \quad (4)$$

$h\min \leq h \leq h\max$ $k\min \leq k \leq k\max$ and performs a convolutional operation by the following equation:

$$xL3(i, j) = \sum_{\substack{h\min \leq h \leq h\max \\ k\min \leq k \leq k\max}} x(i-h, j-k) \times \nabla^2 G(h, k) \quad (5)$$

to find a second-order differentiated image xL3 which is sent to a binarizer 37. Here, $\sigma$ is a preset constant, and the larger the $\sigma$ is, the more apt an edge of a lower frequency component to be detected. Also, $h_{min}$, $h_{max}$, $k_{min}$, $k_{max}$ are constants for defining the span of the filter which implements Laplacian G.

Figure 9:
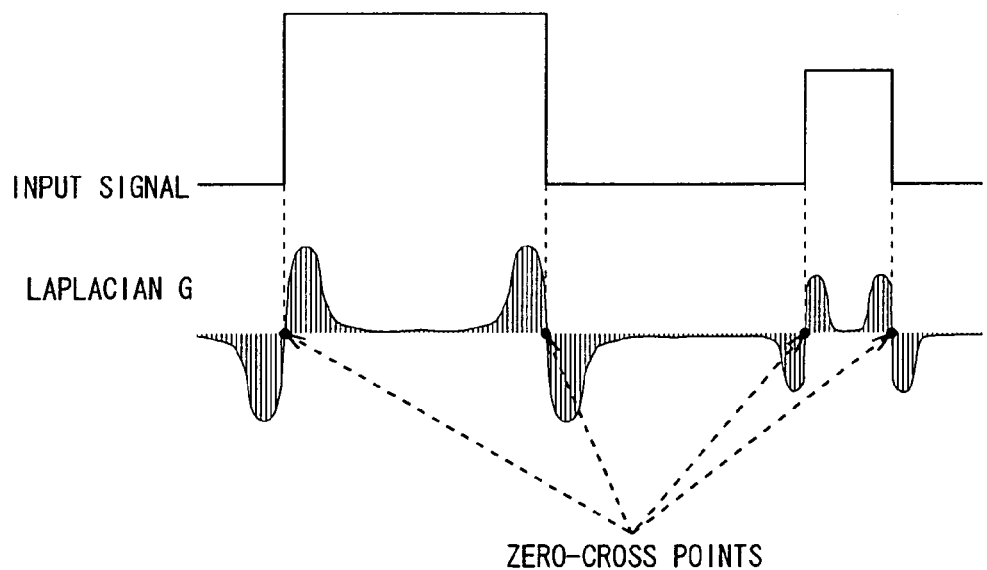
FIG. 9 is a schematic diagram used for explaining zero-cross points.

The binarizer 37 outputs the value "1" when a pixel value is "0" or more and the value "0" when the pixel value is less than "0" at each of pixels on the second-order differentiated image xL3, to produce a binary image xL4 which is sent to a boundary point detector 39. The binary point detector 39 applies the binary image xL4 with neighborhood processing as given by the following equation:

$$p(i, j) = \begin{cases} 1 & \dots \ b(i, j) \neq b(i+di, j+dj) \\ & -1 \leq di, dj \leq 1 \\ 0 & \dots \ \text{others} \end{cases} \quad (6)$$

to extract boundary points on a binary pattern to produce a feature point image pL1 which is sent to the memory 32A (FIG. 7). Stated another way, the boundary point detector 39 outputs the value "1" only when pixels having different values exist within a neighborhood region, regarding that a feature point is present at a central position among them. The feature point extracted in this way is referred to as a zero-cross point which means a central point in an edge pattern at which the pixel value presents an abrupt change, as shown in FIG. 9.

Turning back to FIG. 7, the memory 32A temporarily accumulates the feature point image pL1, and subsequently reads the feature point image pL1 at a predetermined timing to send it to a confidence level calculator 45. Similarly, the memory 32B temporarily accumulates the feature point image pS1, and subsequently reads the feature point image pS1 at a predetermined timing to send it to the confidence level calculator 45.

The confidence level calculator 45 calculates a confidence level which indicates the amount of correct misregistration for each of a plurality of previous provided misregistration for candidates dn=(dxn, dyn) based on the feature point image pL1, pS1. The misregistration amount candidate dn may be given by inequalities as shown below, for example, by selecting a maximum value for the amount of misregistration which may be produced:

−dxmax≦dxn≦dxmax−

−dymax≦dyn≦dymax (7)

where $dx_{max}$ indicates the absolute value of a maximum max misregistration amount in the horizontal direction; and $dy_{max}$ indicates the absolute value of a maximum misregistration amount in the vertical direction.

Figure 10:
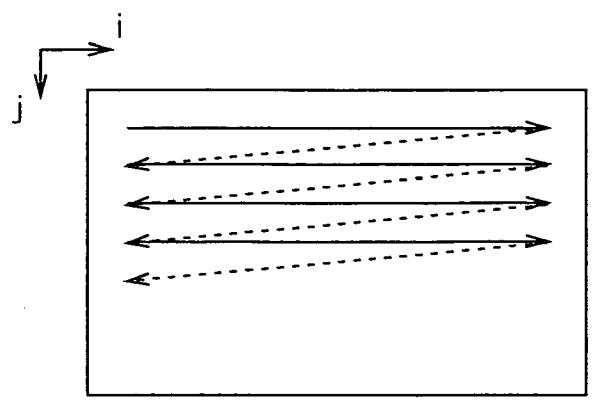
FIG. 10 is a schematic diagram used for explaining an image scanning direction.
Figure 11A:
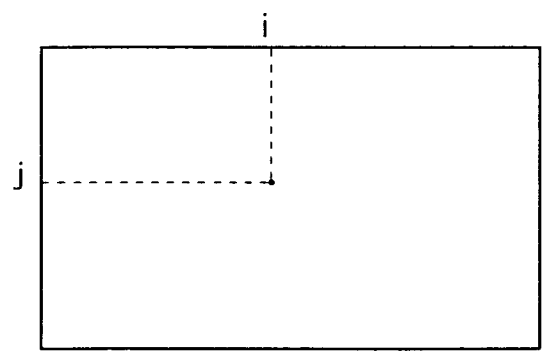
FIGS. 11A and 11B are schematic diagrams used for explaining a feature point search range;_
Figure 11B:
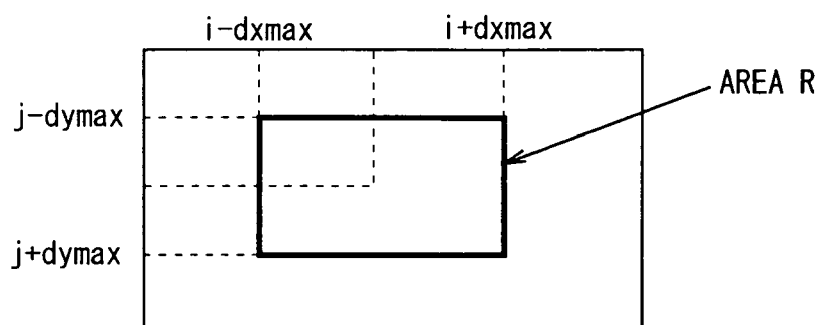

Here, how to calculate the confidence level for each misregistration amount candidate dn will be explained in a specific manner. The confidence level calculator 45 first scans the feature point image pL1 in an order as indicated in FIG. 10 to detect a position at which the pixel value indicates "1," i.e., the position of a feature point. Assuming that the position of a pixel corresponding to a feature point of interest in the feature point image pL1 is at (i,j) (FIG. 11A), the confidence level calculator 45 examines whether or not a feature point exists on each of positions (i+dxn, j+dyn) on the feature point image pS1, corresponding to a plurality of misregistration amount candidates dn=(dxn, dyn). When the misregistration amount candidate dn is given by the inequalities such as those (7) mentioned above, a feature point search range on the feature point image pS1 is represented by an area R as shown in FIG. 11B.

As a result, when the confidence level calculator 45 detects that a feature point exists at a position (i+dxn, j+dyn) on the feature point image pS1, the confidence level calculator 45 increments the confidence level for the misregistration amount candidate dn=(dxn, dyn) in accordance with the following equation:

cmap(dn)=cmap (dn)+1 (8)

where cmap(dn) is a confidence map for integrating the confidence level for each misregistration amount candidate, and is previously initialized as given by the following equation:

$$cmap(dn)=0 \text{ for all } dn \quad (9)$$

In this way, the confidence level calculator 45 accumulates the confidence levels for all feature points on the feature point image pL1 to produce the confidence map cmap (dn) (n=0, 1, 2, . . . ) which is sent to a maximum value detector 47.

The maximum value detector 47 detects a misregistration value candidate $d_{max}$ having a maximum confidence level within the confidence map cmap (dn), and sends this as a true misregistration amount $d_{max}$ to the misregistration amount corrector 23 (FIG. 4). For reference, if a plurality of misregistration amount candidates dn having the same confidence level exist, the maximum value detector 47 selects the misregistration amount candidate dn that exhibits the smallest magnitude |dn| of the misregistration amount found by the following equation:

$$|dn|^2 = dxn^2 + dyn^2 \quad (10)$$

Also, when the maximum value $d_{max}$ of a detected confidence level is lower than a predetermined threshold value, i.e., does not satisfy a condition given by the following equation:

$$cmax > a \times T_{count} \quad (11)$$
$$0.0 \leq a \leq 1.0$$

the maximum value detector 47 sets d=(0,0) so as not to perform a misregistration correction, regarding that a sufficiently confident misregistration amount cannot be available. In the above equation, a is a coefficient for determining a threshold value, and is a preset value, and $T_{count}$ indicates the total number of feature points extracted from the long time exposed image xL2.

Turning back to FIG. 4, the misregistration corrector 23 translates the short time exposed image xS1 supplied from the memory 16 in accordance with the following equation:

$$xS4(i,j) \, xS1(i-dx,j-dy) \quad (12)$$

based on the misregistration amount vector d detected by the misregistration amount detector 27, to correct the misregistration with respect to the long time exposed image xL1, and sends a resultant short time exposed image xS4 to the image composer 20.

The image composer 20 composes the long time exposed image xL1 supplied from the memory 14 and the short time exposed image xS4 corrected by the misregistration corrector 23 to produce a single composite image x1 having a wider dynamic range which is sent to a dynamic range compressor 49.

Figure 12:
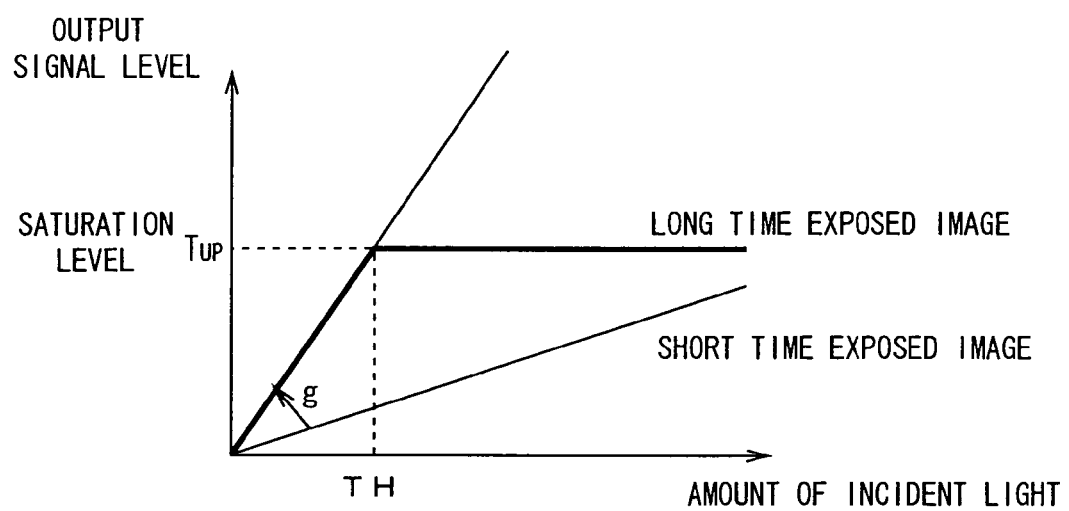
FIG. 12 is a schematic diagram used for explaining an image composing method.

A method of composing these long time exposed image xL1 and short time exposed image xS4 may involve accumulating a coefficient corresponding to the ratio of the amounts of exposure, with which respective images were captured, for each of the images, and subsequently outputting the respective images in turn according to thresholding to produce the composite image x1. In the following, the image composing method implemented by the image composer 20 will be explained in a specific manner with reference to FIG. 12. In FIG. 12, the horizontal axis represents the amount of incident light on the CCD 12, and the vertical axis represents a signal level of an output signal delivered from the CCD 12, i.e., a pixel level of a captured image.

As shown in FIG. 12, the long time exposed image xL1 is represented by a straight line having a large slope, but exhibits a constant signal level of the output signal due to saturation of the CCD 12 when the amount of incident light is equal to or larger than a predetermined level $T_{UP}$. The short time exposed image xS4 in turn has a small slope, and the output signal delivered from the CCD 12 saturates with a larger amount of incident light than the long time exposed image xL1.

Consequently, the image composer 20 first accumulates the coefficient q calculated by the aforementioned equation (2) for the output signal corresponding to the short time exposed image xS4 to match the slope of the straight line portion with that of the long time exposed image xL1. Subsequently, referring to the output signal corresponding to the long time exposed image xL1, the image composer 20 selects the output signal of the long time exposed image xL1 rather than the output signal of the short time exposed image xS4 when the output signal level of short time exposed image xS4 is equal to or lower than the predetermined threshold value $T_{UP}$, and selects and outputs the output signal corresponding to the short time exposed image xS4 rather than the output signal of the long time exposed image xL1 when the output signal level of short time exposed image xS4 is higher than the predetermined threshold value $T_{UP}$, thereby producing the composite image x1 made from the long time exposed image xL1 and the short time exposed image xS4.

The image composing method implemented by the image composer 20 is represented by the following equation:

$$x1 = \begin{cases} xL1 & \ldots xL1 \leq TH \\ xS4 \times g & \ldots xL1 > TH \end{cases} \quad (13)$$

The coefficient g accumulated to the output signal corresponding to the short time exposed image xS4 is the ratio of the respective exposure times which is calculated by the aforementioned equation (2). In this way, if the ratio of exposing times is N times, the dynamic range of the composite image x1 is extended by a factor of N.

Next, the dynamic range compressor 49 compresses the dynamic range of the composite image x1 in accordance with the data processing capabilities of a transmission system, a display, a recorder and so on, not shown, disposed at stages subsequent thereto, and outputs a resulting compressed composite image y1 to the outside. More specifically, the dynamic range compressor 49 employs a method of converting a pixel level of each pixel in the composite image x1 using a function having an input/output relationship as shown in FIG. 13 (hereinafter referred to as the "level conversion function"), as a method of compressing the composite image x1 having a wide dynamic range (hereinafter referred to as the "level conversion").

Figure 13:
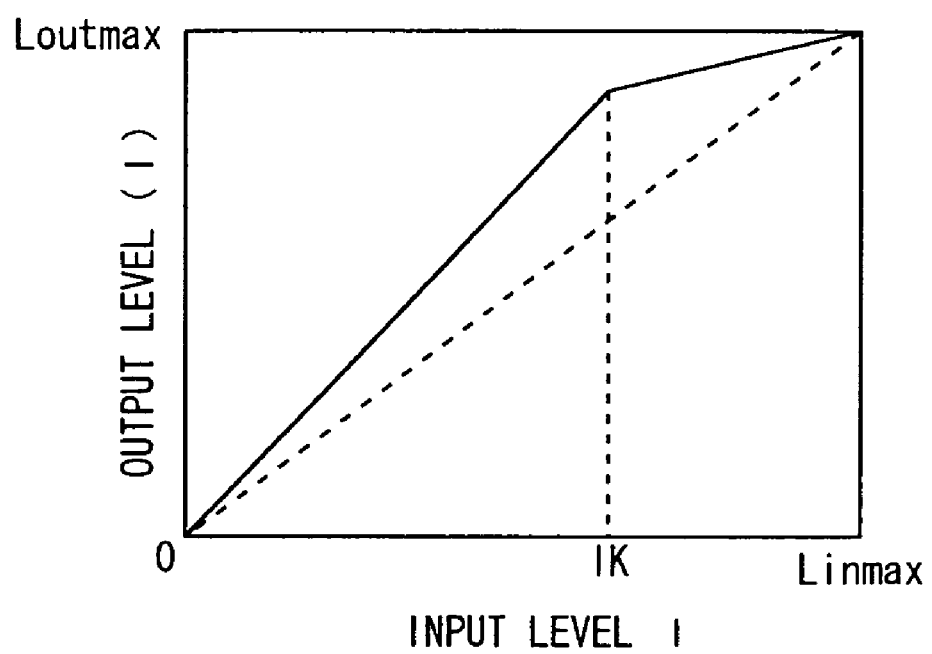
FIG. 13 is a schematic diagram used for explaining a level conversion function.

In FIG. 13, the horizontal axis represents a pixel level l of the inputted composite image x1, and the vertical axis represents a pixel level T(l) of the compressed composite image y1 which has undergone the level conversion processing. Linmax indicates a maximum pixel level that can be taken by each pixel in the inputted composite image x1, and Loutmax indicates a maximum pixel level which can be taken by each pixel in the compressed composite image y1 outputted from the dynamic range compressor 49. In this level conversion, the full dynamic range is compressed, while ensuring the contrast in low and intermediate level ranges at the cost of the contrast in a high level range.

Figure 14:
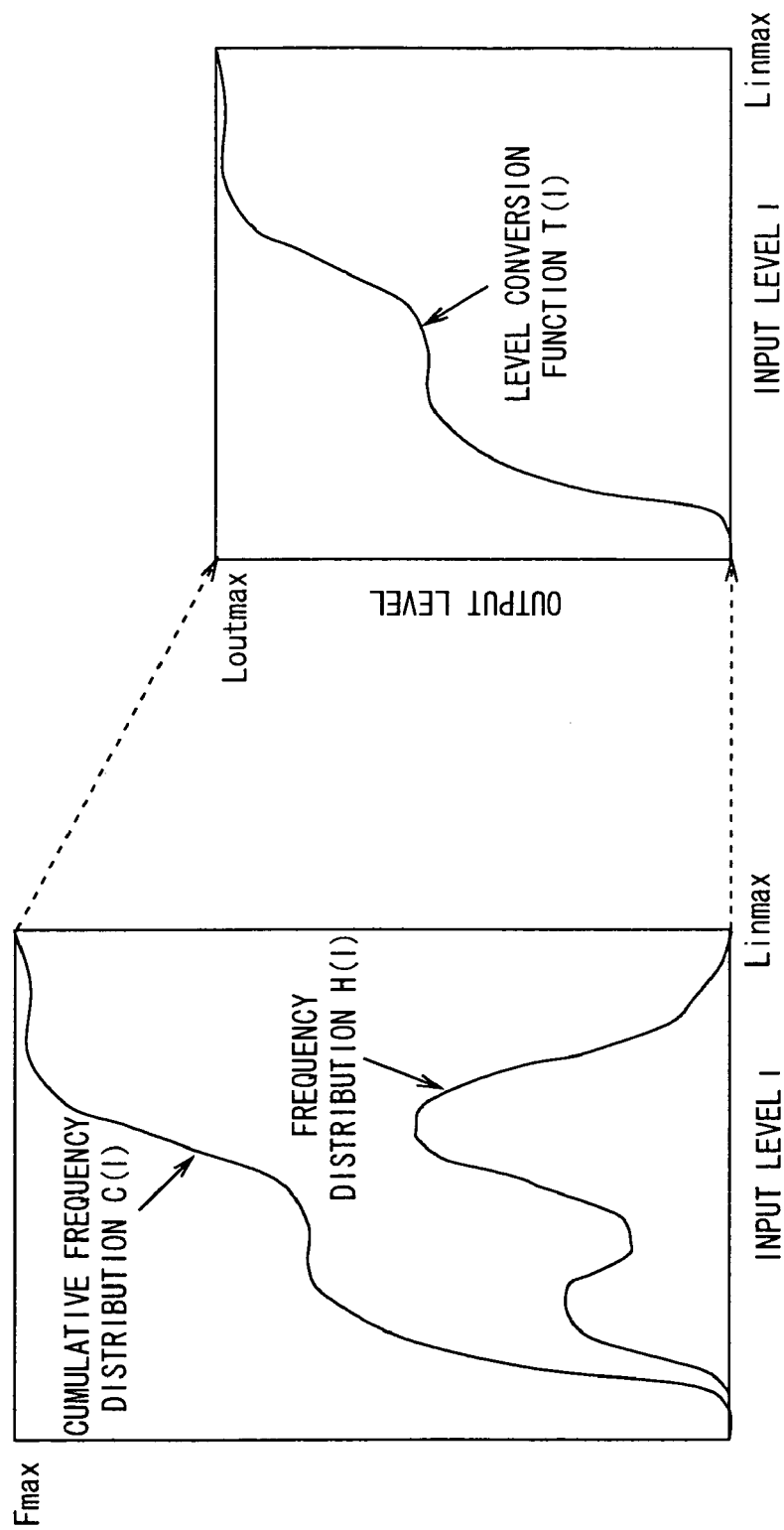
FIG. 14 is a schematic diagram used for explaining histogram equalization.

Alternatively, the method of compressing the composite image x1 having a wide dynamic range may involve adaptively changing the level conversion function in accordance with the frequency distribution of the pixel levels on the composite image x1. As a representative example, a method called "histogram equalization" may be presented. FIG. 14 shows the principles of a method which implements the histogram equalization, where Fmax is a maximum value for a cumulative frequency which indicates the total number of pixels used to calculate the frequency.

This compression method according to the histogram equalization first produces a frequency distribution H(l) with respect to the pixel level 1 of an inputted composite image x1, and next produces a cumulative frequency distribution C(l) in accordance with the following equation:

$$C(l) = \sum_{k=0}^{l} H(k) \tag{14}$$

Then, the compression method according to the histogram equalization normalizes the vertical axis of the cumulative frequency distribution to a level range possibly taken by a compressed composite image y1 in accordance with the following equation to produce a level conversion function T(l):

$$T(l) = \frac{C(l)}{F \max} \times Lout \max \tag{15}$$

The compression method according to the histogram equalization utilizes the level conversion function T(l) to enable the compression of the full dynamic range while ensuring the contrast in a region composed by levels which present a high appearance frequency (a region having a large area).

With the foregoing configuration, the misregistration amount detector 27 extracts feature points respectively from a long time exposed image xL2 and a short time exposed image xS3, captured with different exposure times, detects the misregistration amount candidate presenting the highest confidence level within a plurality of previously provided misregistration amount candidates dn based on the positional relationship of respective feature points extracted from the long time exposed image xL2 and respective feature points extracted from the short time exposed image xS3, and sends the detected misregistration amount candidate as a true misregistration amount d the misregistration corrector 23.

The misregistration corrector 23 corrects the misregistration of the short time exposed image xS1 with respect to the long time exposed image xL1 based on the misregistration amount d sent from the misregistration amount detector 27, and sends a resultant short time exposed image xS4 to the image composer 20. The image composer 20 composes the long time exposed image xL1 and the misregistration corrected short time exposed image xS4 to produce a single composite image x1 having a wide dynamic range.

By thus composing the long time exposed image xL1 and the short time exposed image xS1 after correcting the misregistration therebetween, the image quality will never be degraded near the edges as observed in a composite image which would be composed with misregistration present between two images.

According to the configuration described above, the misregistration of the short time exposed image xS1 is corrected with respect to the long time exposed image xL1, and then the long time exposed image xL1 and the misregistration corrected short time exposed image xS4 are composed to produce the composite image x1 to avoid a degraded image quality which would otherwise be found when two images are composed without correction, thereby making it possible to produce a natural composite image suitable for an object to be imaged.

(2) Second Embodiment

Figure 15:
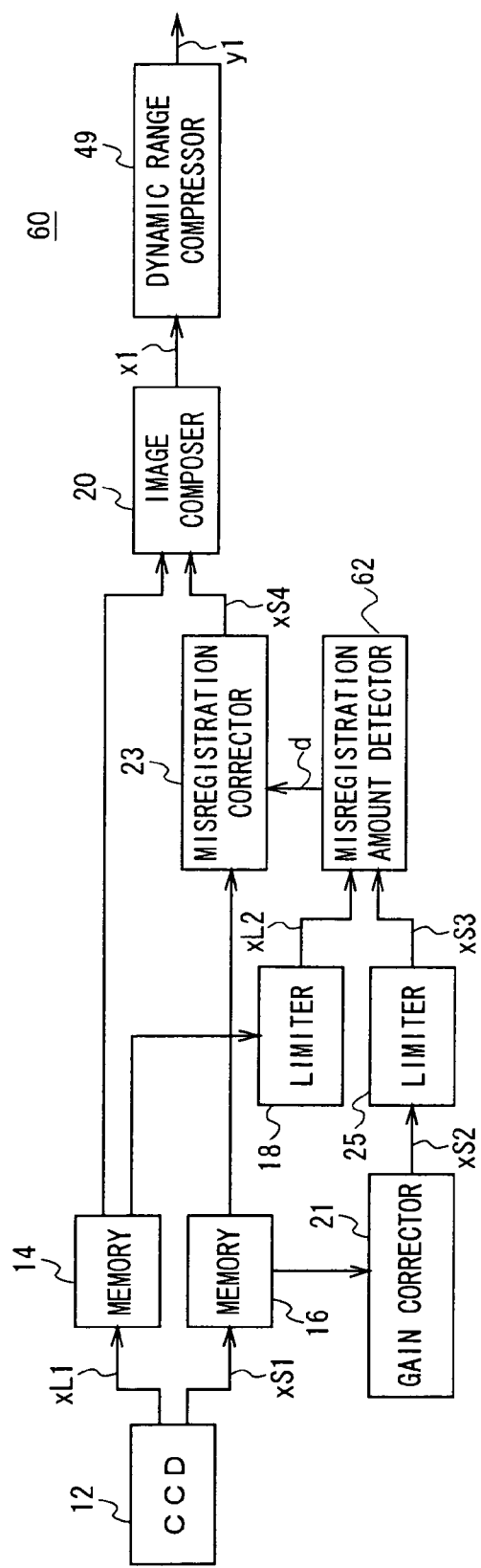
FIG. 15 is a block diagram illustrating the configuration of a video camera according to a second embodiment.

In FIG. 15, in which parts corresponding to those in FIG. 4 are designated by the same reference numerals, a video camera according to a second embodiment, generally designated by reference numeral 60, is configured in a similar manner to the video camera 10 according to the first embodiment except for the configuration of a misregistration amount detector 62.

Figure 16:
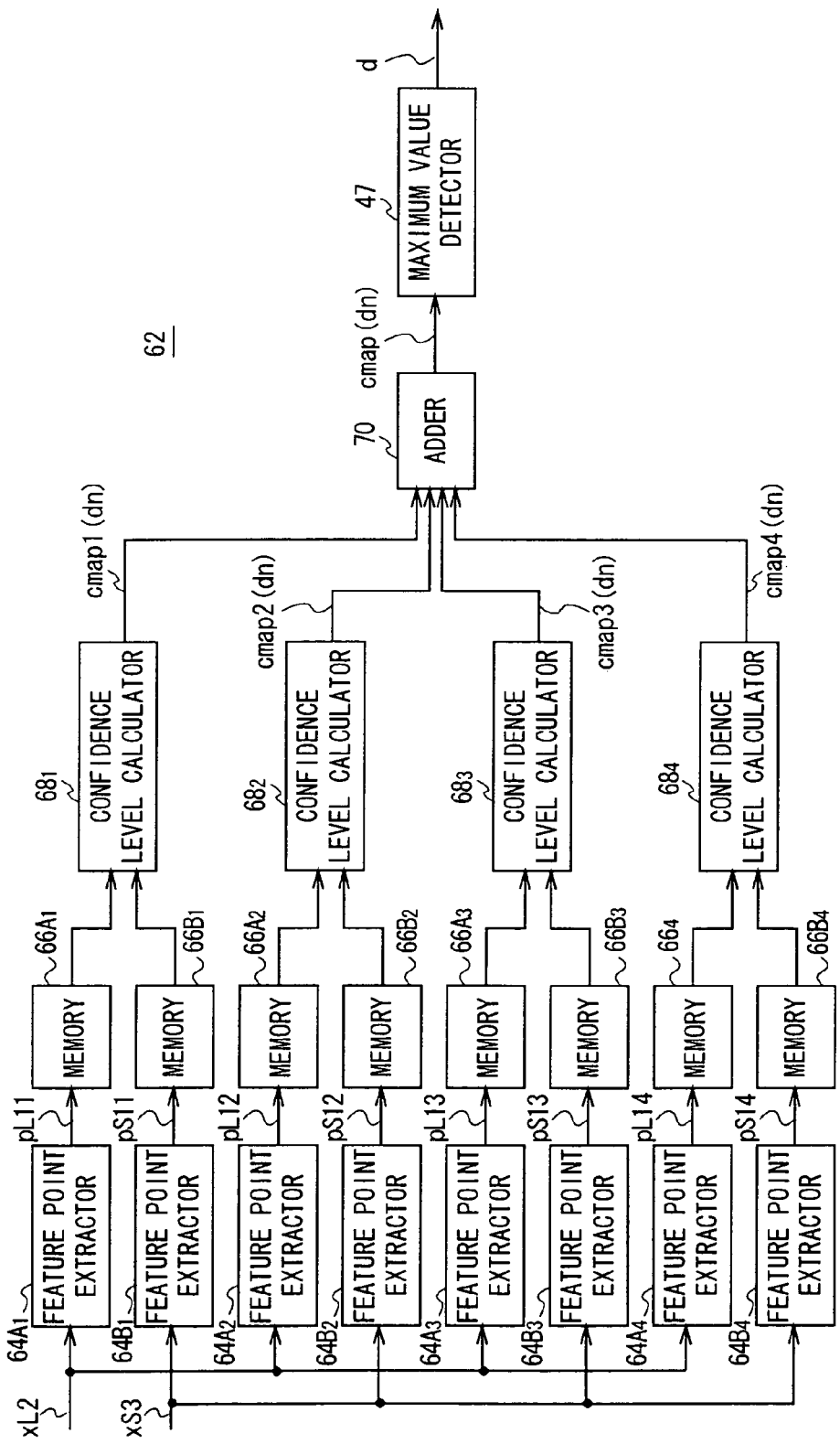
FIG. 16 is a block diagram illustrating the configuration of a misregistration amount detector.

FIG. 16, in which parts corresponding to those in FIG. 7 are designated by the same reference numerals, illustrates the configuration of the misregistration amount detector 62. This misregistration amount detector 62 is adapted to extract four types of feature points. More specifically, zero-cross points as previously shown in FIG. 9 are classified into feature points P1 to P4 as shown in FIG. 17, based on the signs of pixel values possessed by pixels surrounding the respective zero-cross points.

The following description will be directed to a misregistration amount detection performed by the misregistration amount detector 62. The misregistration amount detector 62 inputs a long time exposed image xL2 supplied from the limiter 18 to feature point extractors $64A_1$ to $64A_4$, and inputs a short time exposed image xS3 supplied from the limiter 25 to feature point extractors $64B_1$ to $64B_4$.

The feature point extractor $64A_1$ extracts only feature points P1 from the long time exposed image xL2 to produce a feature point image pL11 which is sent to a memory $66A_1$. The feature point extractor $64B_1$ in turn extracts only the feature point P1 from the short time exposed image xS3 to produce a feature point image sP11 which is sent to a memory $66B_1$. Similarly, the feature point extractors $64A_2$ to $64A_4$ extract only the feature points P2 to P4 corresponding thereto from the long time exposed image xL2 to produce feature point images pL12 to pL14 which are sent to corresponding memories $66A_2$ to $66A_4$, respectively. The feature points extractors $64B_2$ to $64B_4$ in turn extract only feature points P2 to P4 corresponding thereto from the short time exposed image xS3 to produce feature point images pS12 to pS14 which are sent to corresponding memories $66B_2$ to $66B_4$, respectively.

The memory $66A_1$ temporarily stores the feature point image pL11, and subsequently reads the feature point image pL11 at a predetermined timing to send it to a confidence level calculator $68_1$. The memory $66B_1$, in turn, temporarily stores the feature point image ps11, and subsequently reads the feature point image ps11 at a predetermined timing to send it to the confidence level calculator $68_1$. Similarly, the memories $66A_2$ to $66A_4$ temporarily store the feature point images pL12 to pL14, respectively, and read them at a predetermined timing to send them to corresponding confidence level calculators $68_2$ to $68_4$, respectively. The memories $66B_2$ to $66B_4$ temporarily store the feature point images pS12 to pS14, respectively, and read them at a predetermined timing to send them to corresponding confidence level calculators $68_2$ to $68_4$, respectively.

The confidence level calculator 681 produces a confidence map cmap1(dn) based on the feature point images pL11, pS11 and sends the confidence map cmap1(dn) to an adder 70. Similarly, the confidence level calculators 68₂ to 68₄ produce confidence map cmap2(dn) to cmap4(dn), respectively, and send them to the adder 70. The adder 70 adds the confidence maps cmap1(dn) to cmap4(dn) for each element in accordance with the following equation:

$$cmap(dn) = \sum_{N=1}^{4} cmapN(dn) \quad (16)$$

to produce a single confidence map cmap(dn) which is sent to a maximum value detector 47. The maximum value detector 47 detects a misregistration amount candidate $d_{max}$ having a maximum confidence level within the confidence map cmap(dn), and sends this as a true misregistration amount d to a misregistration amount corrector (FIG. 15).

In the foregoing configuration, the misregistration amount detector 62 extracts four types of feature points P1 to P4, respectively from the long time exposed image xL2 and the short time exposed image xS3, captured with different exposure times, and calculates the confidence level for a plurality of misregistration amount candidates dn for each type of the extracted feature points. Then, the misregistration amount detector 62 calculates the sum of the confidence levels calculated for each type of the feature points for each misregistration amount candidate dn, and detects the misregistration amount candidate dn having the highest confidence level within the thus calculated confidence levels for the plurality of misregistration amount candidates dn, and sends this as a true misregistration amount d to the misregistration corrector 23.

The misregistration corrector 23 corrects the misregistration of the short time exposed image xS1 with respect to the long time exposed image xL1 based on the misregistration amount d sent from the misregistration amount detector 27, and sends a resultant short time exposed image xS4 to the image composer 20. The image composer 20 composes the long time exposed image xL1 and the misregistration corrected short time exposed image xS4 to produce a single composite image x1 having a wide dynamic range.

By thus composing the long time exposed image xL1 and the short time exposed image xS1 after correcting the misregistration therebetween, the image quality will never be degraded near the edges as observed in a composite image which would be composed with misregistration present between two images.

According to the configuration described above, the misregistration of the short time exposed image xS1 is corrected with respect to the long time exposed image xL1, and then the long time exposed image xL1 and the misregistration corrected short time exposed image xS4 are composed to produce the composite image x1 to avoid a degraded image quality which would otherwise be found when two images are composed without correction, thereby making it possible to produce a natural composite image corresponding to an object to be imaged.

In addition, since plural types of feature points are extracted from the long time exposed image xL2 and the short time exposed image xS3 to detect the misregistration amount d using the thus extracted feature points of the plural types, the misregistration amount can be more accurately detected as compared with the misregistration amount detector 27 in the first embodiment.

(3) Third Embodiment

Figure 18:
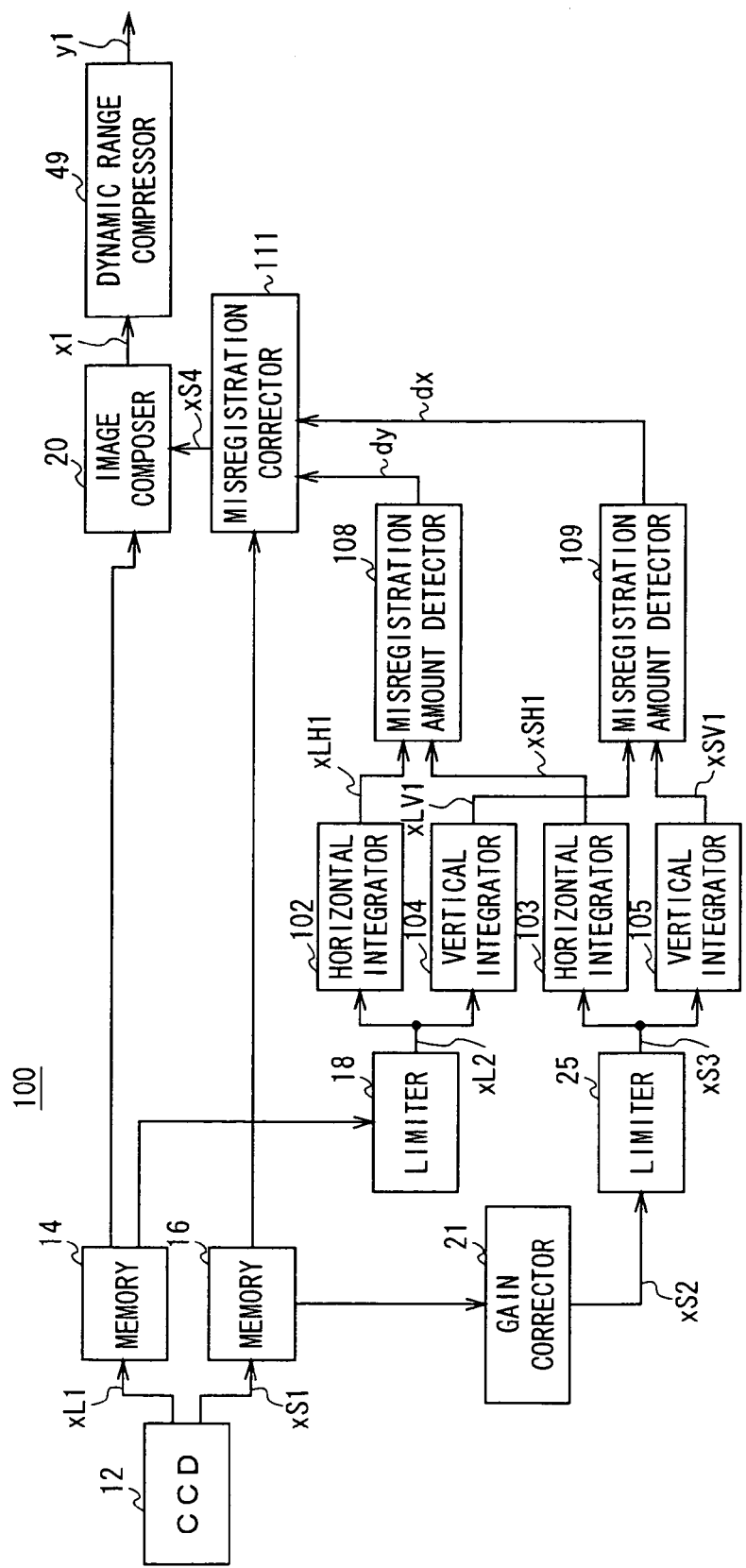
FIG. 18 is a block diagram illustrating the configuration of a video camera according to a third embodiment.

In FIG. 18, in which parts corresponding to those in FIG. 4 are designated by the same reference numerals, a video camera, the configuration of which is generally designated by reference numeral 100, is configured in a manner similar to the video camera 10 according to the first embodiment except for the configuration of horizontal integrators 102, 103, vertical integrators 104, 105, misregistration amount detectors 108, 109, a misregistration corrector 111.

The video camera 100 supplies the horizontal integrator 102 and the vertical integrator 104 with a long time exposed image xL2 sent from the limiter 18, and supplies the horizontal integrator 103 and the vertical integrator 105 with a short time exposed image xS3 sent from the limiter 25. The horizontal integrator 102 integrates pixel values at respective vertical positions j of the long time exposed image xL2 in the horizontal direction in accordance with the following equation:

$$xLH1(j) = \sum_{i=0}^{Nx-1} xL2(i, j) \quad (17)$$

$$j = 0, 1, 2, \ldots, Ny - 1$$

to produce a one-dimensional data array xLH1 which is sent to the misregistration amount detector 108. In equation (17), $N_X$ and $N_Y$ are the numbers of pixels in the horizontal direction and in the vertical direction of the image.

The vertical integrator 104 integrates pixel values at respective horizontal positions i of the long time exposed image xL2 in the vertical direction in accordance with the following equation:

$$xLV1(j) = \sum_{j=0}^{Ny-1} xL2(i, j) \quad (18)$$

$$i = 0, 1, 2, \ldots, Nx - 1$$

to produce a one-dimensional data array xLV1 which is sent to the misregistration amount detector 109. Similarly, the horizontal integrator 103 produces a one-dimensional data array xSH1 from the short time exposed image xS3, and sends the one-dimensional data array xSH1 to the misregistration amount detector 108. Together with this, the vertical integrator 105 produces a one-dimensional data array xSV1 from the short time exposed image xS3, and sends the one-dimensional data array xSV1 to the misregistration amount detector 109.

The misregistration amount detector 108 detects a vertical component dy of a misregistration amount based on the one-dimensional data array xLH1 produced from the long time exposed image xL2 and the one-dimensional data array xSH1 produced from the short time exposed image xS3, and sends the detected vertical component dy to the misregistration corrector 111. Together with this, the misregistration amount detector 109 detects a horizontal component dx of the misregistration amount based on the one-dimensional data array xLV1 produced from the long time exposed image xL2 and the one-dimensional data array xSV1 produced from the short time exposed image xS3, and sends the horizontal component dx to the misregistration corrector 111.

Figure 19:
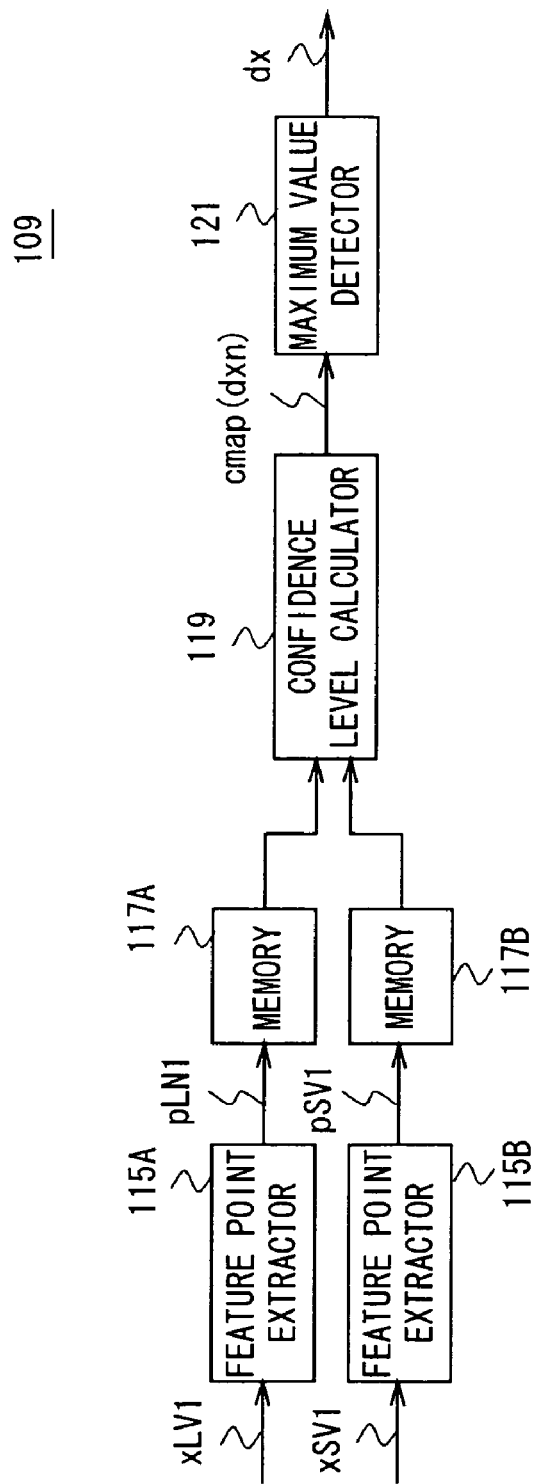
FIG. 19 is block diagram illustrating the configuration of a misregistration amount detector.

It should be noted that the misregistration amount detectors, 108, 109 are similar in configuration, so that the following description will be directed only to the configuration of the misregistration amount detector 109 with reference to FIG. 19. The misregistration amount detector 109 inputs the one-dimensional data array xLV1 produced from the long time exposed image xL2 to a feature point extractor 115A, and inputs the one-dimensional data array xSV1 produced from the short time exposed image xS3 to a feature point extractor 115B.

The feature point extractor 115A extracts feature points in the one-dimensional data array xLV1 to produce a one-dimensional feature point array pLV1 which is sent to a memory 117A. The feature point called herein is the zero-cross point shown in FIG. 9, and the one-dimensional data array xLV1 is an array of binary data each indicating whether or not a feature point exists at a position i. Similarly, the feature point extractor 115B extracts feature points in the one-dimensional data array xSV1 to produce a one-dimensional data array pSV1 which is sent to a memory 117B.

The memory 117A temporarily stores the feature point array pLV1, and subsequently reads the feature point array pLV1 at a predetermined timing to send it to a confidence level calculator 119. Similarly, the memory 117B temporarily stores the feature point array pSV1, and subsequently reads the feature point array pSV1 at a predetermined timing to send it to the confidence level calculator 119.

The confidence level calculator 119 calculates a confidence level as a correct misregistration amount for a horizontal component dx of each of a plurality of previously provided misregistration amount candidates, based on the feature point arrays pLV1, pSV1. The horizontal component dx of this misregistration amount candidate is given, for example, by the following inequality:

$$-dxmax \leq dxn \leq dxmax \quad (19)$$

by selecting a maximum value for the horizontal component of a misregistration amount which could occur.

Figure 20:
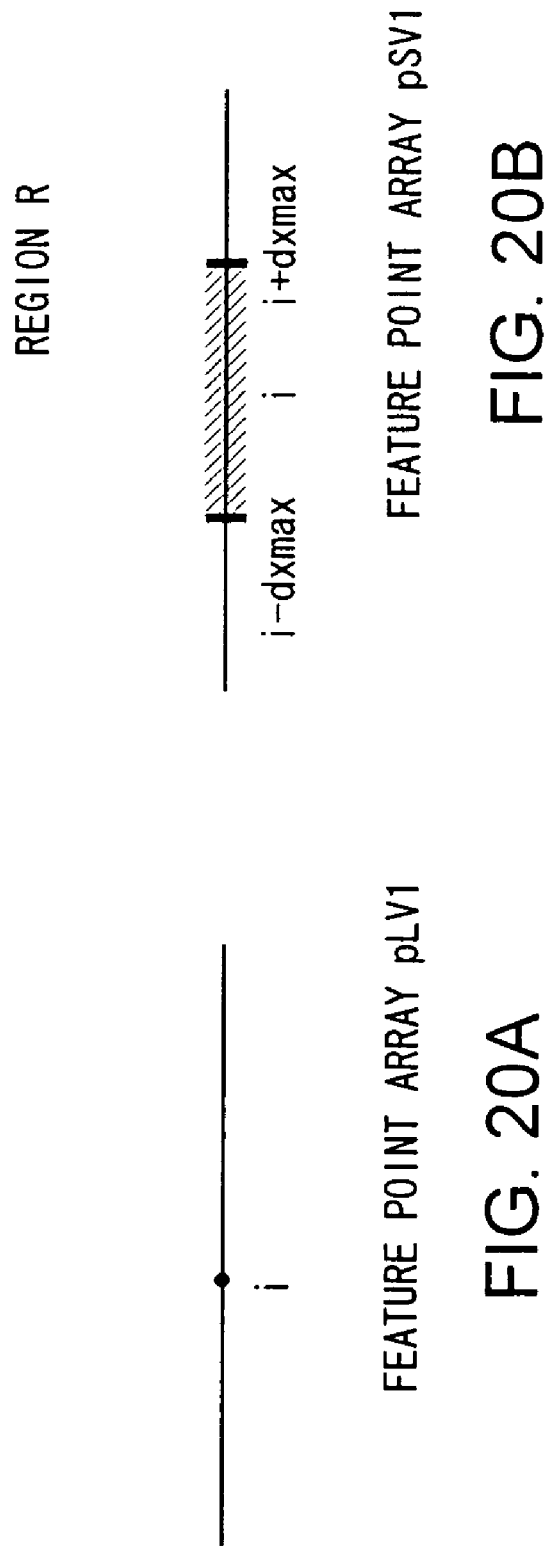
FIGS. 20A and 20B are diagrams showing a feature point search range.

Here, how to calculate the confidence level for the horizontal component dx of each misregistration amount candidate will be explained in a specific manner. The confidence level calculator 119 first scans the feature point array pLV1 to detect the position of a point at which the value indicates "1," i.e., the position of a feature point. Assuming that the position of a feature point of interest on the feature point array pLV1 is at i (FIG. 20A), the confidence level calculator 119 examines whether or not a feature point exists at a position i+dx on the feature point array pSV1, corresponding to a horizontal component dx of each of a plurality of misregistration amount candidates. When the horizontal component dx of the misregistration amount candidate is given by the inequality such as that (19) mentioned above, a feature point search range on the feature point array pSV1 is represented by an area R as shown in FIG. 20B.

As a result, when the confidence level calculator 119 detects that a feature point exists at a position i+dx on the feature point array pSV1, the confidence level calculator 119 increments the confidence level for the horizontal component dx of the misregistration amount candidate. In this way, the confidence level calculator 119 integrates the confidence levels for all feature points on the feature point array pLV1 to produce a confidence map cmap(dxn) (n=0, 1, 2, . . . )
which is sent to a maximum value detector 121. The maximum value detector 121 detects a horizontal component $dx_{max}$ of a misregistration amount candidate which has a maximum confidence level within the confidence map cmap(dxn), and sends this as a horizontal component dx of a true misregistration amount to the misregistration corrector 111 (FIG. 18).

Turning back to FIG. 18, the misregistration corrector 111 translates the short time exposed image xS1 based on the horizontal component dx of the misregistration amount supplied from the misregistration amount detector 109 and the vertical component dy of the misregistration amount supplied from the misregistration amount detector 108 to correct the misregistration of the short time exposed image xS1 with respect to the long time exposed image xL1, and sends a resultant short time exposed image xS4 to the image composer 20.

In the foregoing configuration, the horizontal integrators 102, 103 integrate pixel values for each pixel array in the horizontal direction of a long time exposed image xL2 and a short time exposed image xS3, respectively, to produce one-dimensional vertical data arrays xLH1, xSH1 which are sent to the misregistration amount detector 108. Together with this, the vertical integrators 104, 105 integrate pixel values for each pixel arrays in the vertical direction of the long time exposed image xL2 and the short time exposed image xS3, respectively, to produce one-dimensional horizontal data arrays xLV1, xSV1 which are sent to the misregistration amount detector 109.

The misregistration amount detector 108 extracts feature points from the one-dimensional vertical data arrays xLH1, xSH1, detects a vertical component of the misregistration amount candidate presenting the highest confidence level within vertical components dyn of a plurality of previously provided misregistration amount candidates based on the positional relationship of the respective feature points in the one-dimensional data array xLH1 and the respective feature points in the one-dimensional data array xSH1 extracted as mentioned, and sends this as a true misregistration amount dy to the misregistration corrector 111. Similarly, the misregistration amount detector 109 extracts feature points from the one-dimensional horizontal data arrays xLV1, xSV1, detects a misregistration amount dx based on the positional relationship of the respective feature points in the one-dimensional data array xLV1 and the respective feature points in the one-dimensional data array xSH1 extracted as mentioned, and sends the detected misregistration amount dx to the misregistration corrector 111.

The misregistration amount corrector 111 corrects the misregistration of the short time exposed image xS1 with respect to the long time exposed image xL1 based on the misregistration amounts dx, dy sent from the misregistration amount detectors 109, 108, and sends a resultant short time exposed image xS4 to the image composer 20. The image composer 20 composes the long time exposed image xL1 and the misregistration corrected short time exposed image xS4 to produce a signal composite image x1 having a wide dynamic range.

By thus composing the long time exposed image xL1 and the short time exposed image xS1 after correcting the misregistration therebetween, the image quality will never be degraded near the edges as observed in a composite image which would be composed with misregistration present between two images.

According to the configuration described above, the misregistration of the short time exposed image xS1 is corrected with respect to the long time exposed image xL1, and then the long time exposed image xL1 and the misregistration corrected short time exposed image xS4 are composed to produce the composite image x1 to avoid a degraded image quality which would otherwise be found when two images are composed without correction, thereby making it possible to produce a natural composite image corresponding to an object to be imaged.

Also, by detecting the misregistration amount of the short time exposed image xS1 with respect to the long time exposed image xL1 for each of the horizontal component and the vertical component, it is possible to further reduce the amount of operations and the circuit scale associated with the detection of misregistration.

(4) Fourth Embodiment

Figure 21:
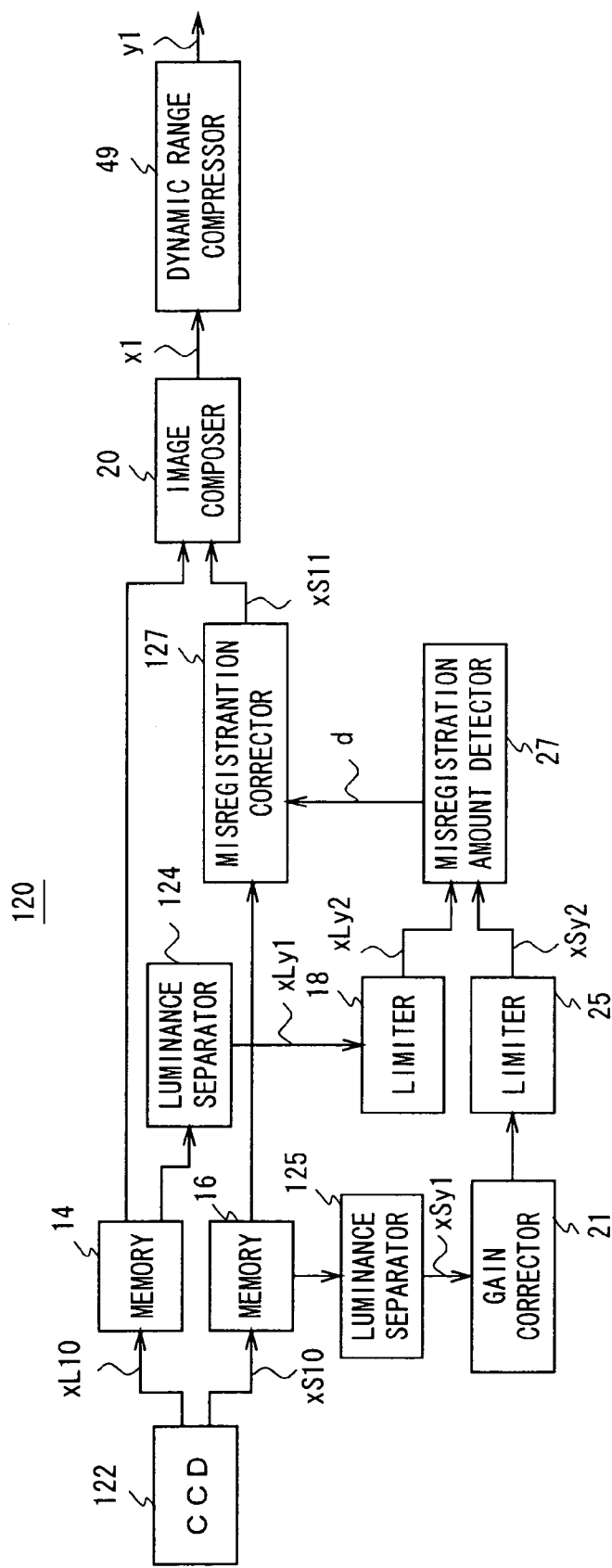
FIG. 21 is a block diagram illustrating the configuration of a video camera according to a fourth embodiment.
Figures 22, 23:
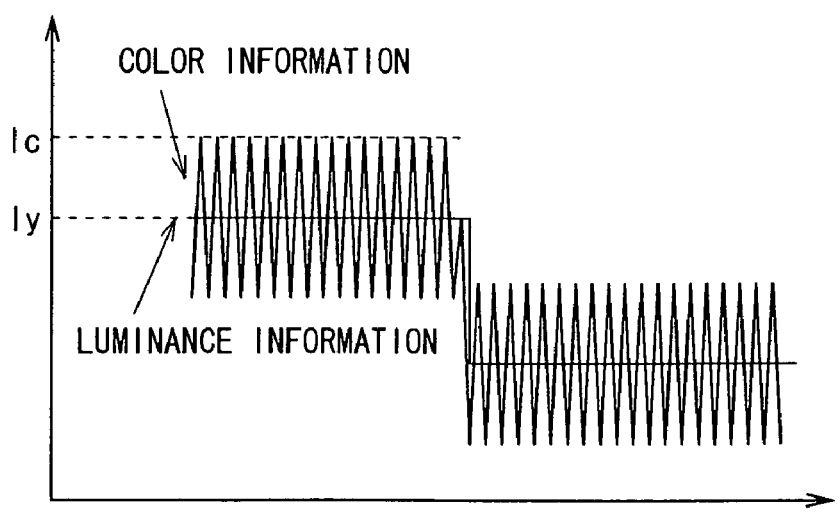
FIG. 22 is a schematic diagram used for explaining an example of a color filter arrangement in a single-plate color camera.
FIG. 23 is a schematic diagram used for explaining an output signal of the single-plate color camera.

In FIG. 21, in which parts corresponding to those in FIG. 4 are designated by the same reference numerals, a video camera according to a fourth embodiment, generally designated by reference numeral 120, comprises a color array filter as shown in FIG. 22 (complementary color diced filter) positioned in front of a CCD 122 to capture a color image through this filter to produce a long time exposed image xL10 and a short time exposed image xS10 represented by output signals, as shown in FIG. 23, in which a frequency modulated color signal is multiplexed on a luminance signal.

In addition, the video camera 120 includes luminance separators 124, 125 previous to a gain corrector 21 and a limiter 18, respectively, to extract luminance information in images. Specifically, the luminance separator 124 extracts luminance information xLy1 from the long time exposed image xL10 in accordance with the following equation:

$$xLy1 = LPF_y(xL10) \quad (20)$$

From the luminance information xLy1, the limiter 18 extracts luminance information xLy2 which is sent to a misregistration amount detector 27. In equation (20), $LPF_y$, ( ) indicates a low pass filter for separating the luminance. Similarly, the luminance separator 125 extracts luminance information xSy1 from the short time exposed image xS10, and luminance information xSy2 is produced sequentially through the gain corrector 21 and a limiter 25, and sent to the misregistration amount detector 27.

The misregistration amount detector 27 detects a misregistration amount d between the luminance information Ly2 produced from the long time exposed image xL10 and the luminance information xSy2 produced from the short time exposed image xs10, and sends the misregistration amount d to a misregistration corrector 127. The misregistration corrector 127 corrects the misregistration of the short time exposed image xS10 based on the misregistration amount d.

In this event, since the value of each pixel forming part of the long time exposed image xL10 and the short time exposed image xS10 is modulated by the color filter (FIG. 22), a pixel xL10 $(i,j)$ on the long time exposed image xL10 and a pixel xS10 (i–dx, j–dy) on the short time exposed image xS10, corresponded by the detected misregistration amount d, do not always correspond to the same color filter. In other words, the misregistration may result in failed correspondence in color. To solve this problem, the misregistration amount corrector 127 corrects the misregistration in accordance with the following equation:

$$xS11(i,j) = xSip(i-dx, j-dy) \quad (21)$$

and sends a resultant short time exposed image xS11 to an image composer 20. In equation (21), xSip(i–dx,j–dy) indicates the value of a pixel at a position (i–dx, j–dy) on the short time exposed image xS10, corresponding to the same color filter as the long time exposed image xL10 $(i,j)$, calculated from the values of neighboring pixels.

Figures 24A, 24B, 25:
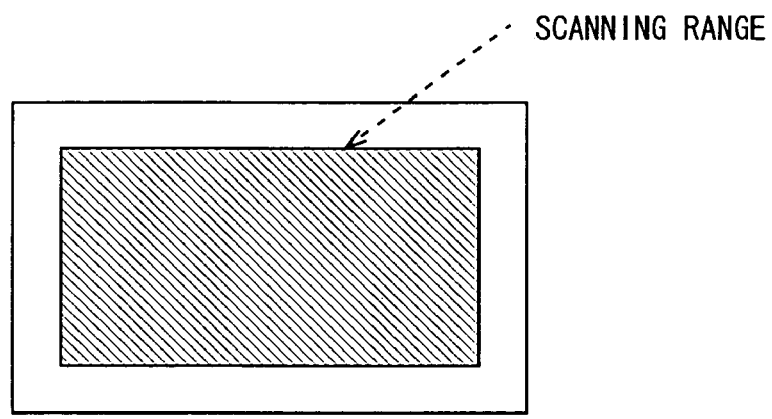
FIGS. 24A and 24B are schematic diagrams used for explaining interpolation processing.
FIG. 25 is a schematic diagram used for explaining a feature point scanning range.

For example, as shown in FIGS. 24A and 24B, assuming that a pixel on the long time exposed image xL10 $(i,j)$ corresponds to a Ye filter with a misregistration amount d=(1,1), xSip(i–dx, j–dy) is interpolated in accordance with the following equation:

$$Xsip(I', j') = \frac{xS10(i'-1, j'-1) + xS10(i'+1, j'-1) + xS10(i'-1, j'-1) + xS10(i'+1, j'+1)}{4} \quad (22)$$

$$i' = i - dx, \quad j' = j - dy$$

In other words, the misregistration corrector 127 corresponds to the same color filter as the long time exposed image xL10 $(i,j)$, and performs linear interpolation using the value of pixel nearest from a position (i–dx, j–dy).

In the foregoing configuration, the misregistration amount detector 27 extracts feature points from the luminance information xLy2 produced from the long time exposed image xL10 and the luminance information xSy2 produced from the short time exposed image xS10, captured with different exposure times, detects the misregistration amount candidate presenting the highest confidence level within a plurality of previously provided misregistration amount candidates dn based on the positional relationship of the respective feature points extracted from the luminance information xLy2 and the respective feature points extracted from the luminance information xSy2, and sends the detected misregistration amount candidate as a true misregistration amount d to the misregistration corrector 127.

The misregistration corrector 127 corrects the misregistration of the short time exposed image xS10 with respect to the long time exposed image xL10 based on the misregistration amount sent from the misregistration amount detector 27, and sends a resultant short time exposed image xS11 to the image composer 20. The image composer 20 composes the long time exposed image xL10 and the misregistration corrected short time exposed image xS11 to produce a single composite image x1 having a wide dynamic range.

By thus composing the long time exposed image xL10 and the short time exposed image xS10 after correcting the misregistration therebetween, the image quality will never be degraded near the edges as observed in a composite image which would be composed with misregistration present between two images.

According to the configuration described above, the misregistration of the short time exposed image xS10 is corrected with respect to the long time exposed image xL10, and then the long time exposed image xL10 and the misregistration corrected short time exposed image xS11 are composed to produce the composite image x1 to avoid a degraded image quality which would otherwise be found when two images are composed without correction, thereby making it possible to produce a natural composite image corresponding to an object to be imaged.

In addition, since the luminance information xLy2 and the luminance information xSy2 are extracted from the long time exposed image xL10 and the short time exposed image xS10, respectively, to detect a misregistration amount d from the luminance information xLy2 and the luminance information xSy2, it is possible to precisely correct misregistration even for a color image.

(5) Other Embodiments

While the foregoing first to fourth embodiments have been described in connection with an implementation in which the gain is corrected within the image composer 20, the present invention, however, is not limited to such gain correction. Alternatively, a gain corrector can be disposed previous to the memory 16 for storing the short time exposed image xS1 to omit the gain correction performed with the image composer 20.

Also, while the foregoing first to fourth embodiments have been described in connection with an implementation in which the short time exposed images xS1, xS10 are corrected for misregistration, the present invention is not limited to the correction to the short time exposed images. Alternatively, the long time exposed images xL1, xL10 can be corrected for misregistration.

Further, while the foregoing first to fourth embodiments have been described in connection with an implementation in which the gain correction is performed on the short time exposed images xS4, xS11, the present invention is not limited to such gain correction. Alternatively, the gain correction can be performed on the long time exposed images xL1, xL10. In this case, the value of each pixel on the long time exposed images xL1, xL10 can be divided by an exposure time ratio g calculated by the aforementioned equation (2).

Further, while the foregoing first to fourth embodiments have been described in connection with an implementation in which the amount of misregistration is detected after the gain correction is performed on the short time exposed images xS1, xS10, the present invention is not limited to such detection accompanied with the gain correction. Alternatively, the amount of misregistration can be detected without gain correction if pixel positions independent of the amount of exposure are used as feature points, as the zero-cross points shown in FIG. 9.

Further, while the foregoing first to fourth embodiments have been described in connection with an implementation in which the confidential calculator 45, 68 or 119 scans the entire feature point image pL1, pL11 to pL14 corresponding to the long time exposed image xL2 to detect feature points and integrate the confidence levels, the present invention is not limited to the scanning of the entire feature point image. Alternatively, since feature points positioned near edges of an image are not likely to appear in the feature point images pS1, pS11 to pS14 corresponding to the short time exposed image xS3 due to the influence of misregistration, a range in which feature points are scanned can be limited on the feature point images pL1, pL11 to pL14, as shown in FIG. 25.

Further, while the foregoing first to fourth embodiments have been described in connection with an implementation in which a search is conducted to see whether or not a corresponding point exists on the feature point image pS1, pS11 to pS14 produced from a short time exposed image xS3 for each feature point on the feature point image pL1, pL11 to pL14 produced from a long time exposed image xL2, the present invention is not limited to such a search. Alternatively, a corresponding point on the feature point image pL1, pL11 to pL14 can be searched for each feature point on the feature point image pS1, ps11 to pS14.

Further, while the foregoing first to fourth embodiments have been described in connection with an implementation in which the confidence level calculator 45 calculates a confidence level by scanning the feature point image pL1, pL11 to pL14 to detect feature points thereon, and examining whether or not corresponding feature points on the feature point image pS1, pS11 to pS14 exist at positions at which the detected feature positions are corrected, using a misregistration amount candidate dn, the present invention is not limited to the thus calculated confidence level. Alternatively, as expressed by the following equation:

$$cmap(dn) = \sum_{i=0}^{Nx-1} \sum_{j=0}^{Ny-1} pL(i, j) \times pS(i - dnx, j - dny) \quad (23)$$

the entire feature point image pS1, pS11 to pS14 can be translated by a currently intended misregistration amount candidate dn, and the total number of feature points that match the feature points on the corresponding feature point image pL1, pL11 to pL14 in position can be employed as a confidence level cmap (dn) for the misregistration amount candidate dn. In equation (23), $N_x$ and $N_y$ are the numbers of pixels in the horizontal direction and the vertical direction, respectively, on the feature point image pS1, pS11 to pS14. For reference, for points (i−dnx, j−dny) which do not exist on the feature point image pS1, pS11 to pS14, the addition indicated by the aforementioned equation (23) is not performed.

Figure 26:
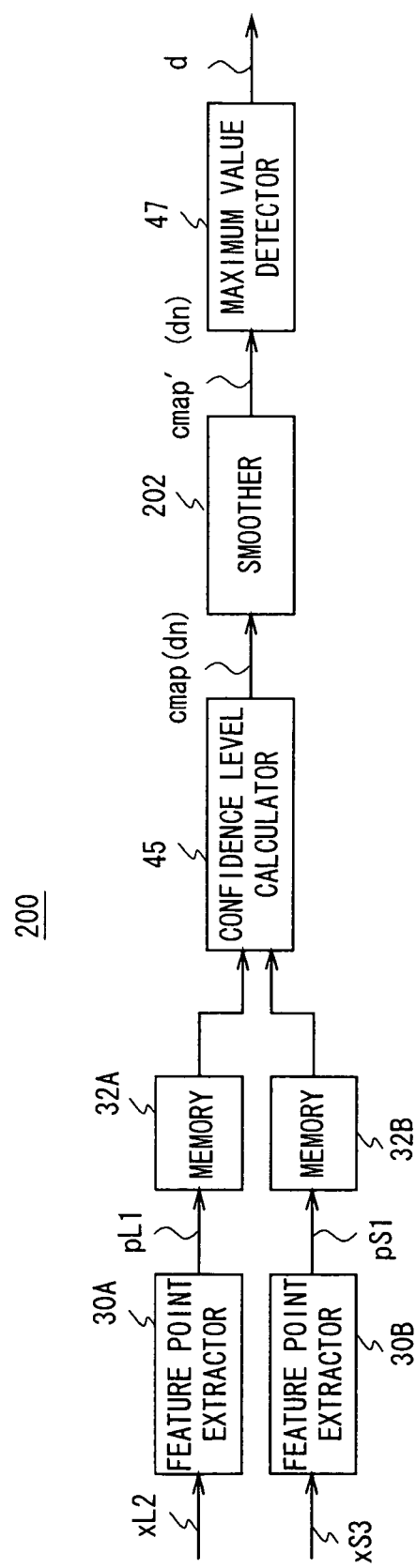
FIG. 26 is a block diagram illustrating the configuration of a misregistration amount detector according to another embodiment.
Figure 27:
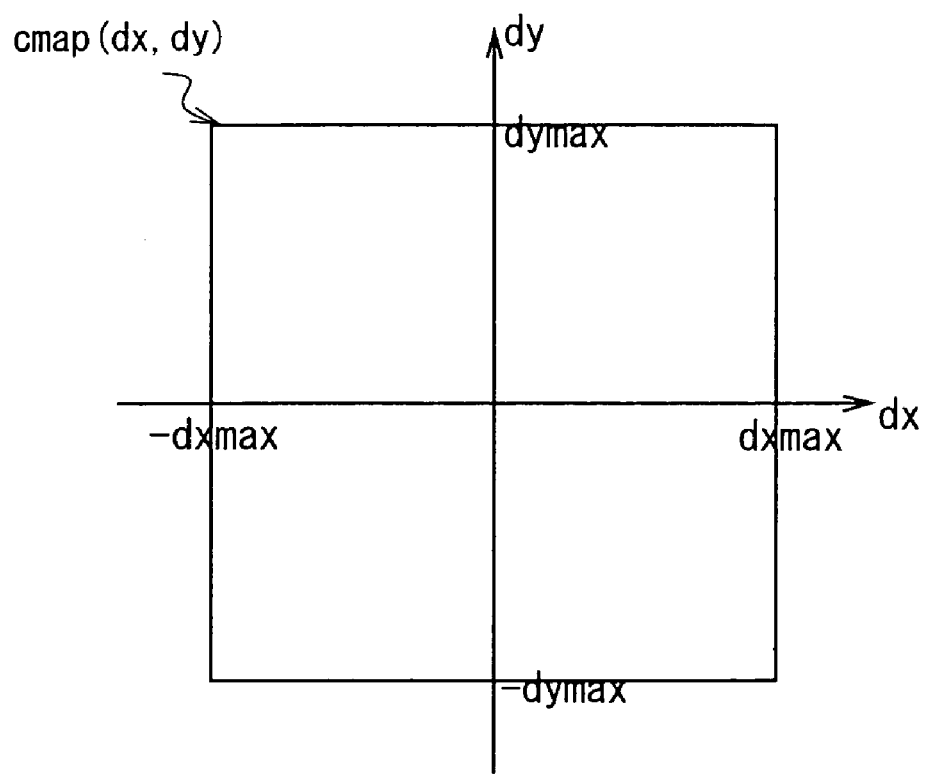
FIG. 27 is a schematic diagram used for explaining a confidence map.

Further, while the foregoing first to fourth embodiments have been described in connection with an implementation in which the maximum value detector 47 detects a misregistration amount candidate $d_{max}$ having a maximum confidence level within the max confidence map cmap (dn) sent from the confidence level calculator 45, and employs $d_{max}$ as a true misregistration amount d, the present invention is not limited to this method of detecting the misregistration amount. Alternatively, as illustrated in a misregistration amount detector 200 in FIG. 26, a smoother 202 can be provided between the confidence level calculator 45 and the maximum value detector 47, such that, taking advantage of the fact that the confidence map cmap (dn) can be regarded as two-dimensional image data cmap (dx, dy) as shown in FIG. 27 which has the values of confidence levels as pixel values, the smoother 202 applies mean-value filtering as expressed by the following equation:

$$cmap'(dx, dy) = \sum_{di=-\frac{M}{2}}^{\frac{M}{2}} \sum_{dj=-\frac{K}{2}}^{\frac{K}{2}} cmap(dx + di, dy + dj) \quad (24)$$

to the image data cmap (dx, dy) to produce a confidence map cmap' (dn), in which case a precise amount of misregistration can be detected with much higher stability.

Figure 28:
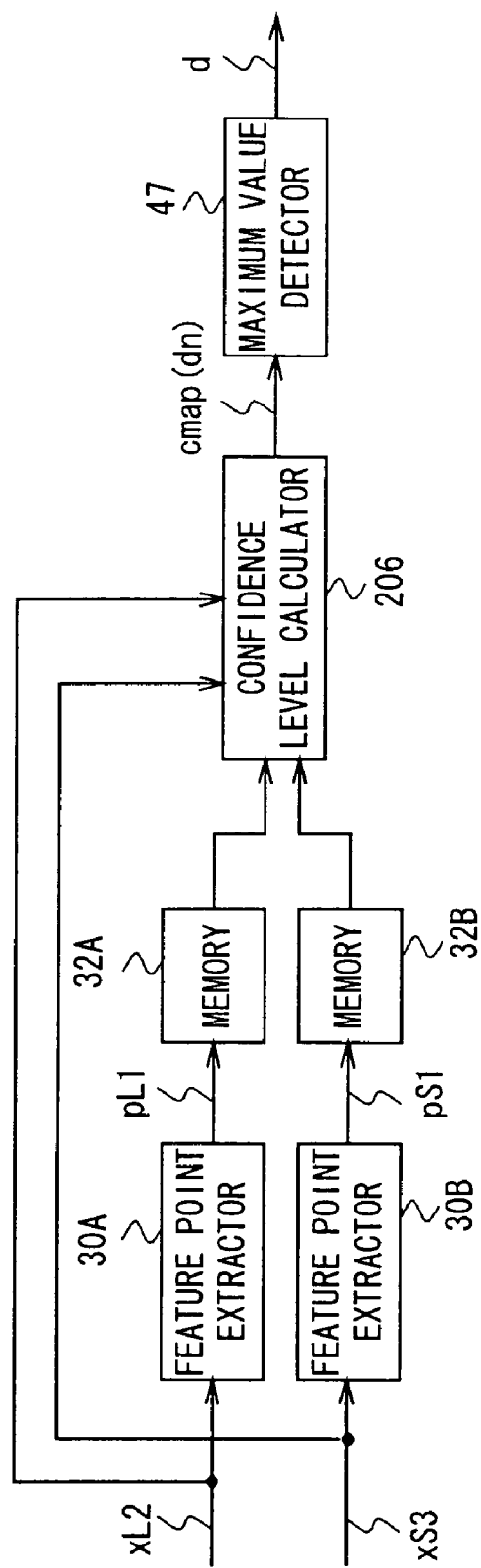
FIG. 28 is a block diagram illustrating the configuration of a misregistration amount detector according to another embodiment.

Further, while the foregoing first to fourth embodiments have been described in connection with an implementation in which the confidence level calculator 45 searches a corresponding point on the feature point image pS1 for each feature point on the feature point image pL1 to produce the confidence map cmap (dn), the present invention is not limited to such a manner of producing the confidence map cmap (dn). Alternatively, as a confidence level calculator 206 in a misregistration amount detector 204 illustrated in FIG. 28, a higher confidence level can be added as corresponding pixel values are closer on the inputted feature point image pL1 and feature point image pS, in which case the amount of misregistration can be detected with much higher stability. In this event, the confidence level calculator 206 can find the confidence map cmap(dn) in accordance with the following equation:

$$cmap(dn)=cmap(dn)+s(dn) \quad (25)$$

where s(dn) is the amount representing the closeness of pixel values on the feature point image pL1 and the feature point image pS, and is calculated, for example, in accordance with the following equation:

$$s(dn) = \begin{cases} 2 & \ldots \\ & |xL''(i,j) - xS''(i-dnx, j-dny)| < T0 \\ 1 & \ldots \\ T0 \le & |xL''(i,j) - xS''(i-dnx, j-dny)| < T1 \\ 0 & \ldots \\ T1 \le & |xL''(i,j) - xS''(i-dnx, j-dny)| \end{cases} \quad (26)$$

Further, while the foregoing first to fourth embodiments have been described in connection with an implementation in which the long time exposed image xL1 and the short time exposed image xS4 are composed to produce a signal composite image, the present invention is not limited to the composition of two images, but three or more images with different amounts of exposure can be composed. In this case, any of a plurality of images is assigned as a reference image, such that a misregistration amount detector and a misregistration corrector are provided to correspond to images other than the reference image and correct misregistration of the images with respect to the reference image.

Further, the foregoing first to fourth embodiments have been described in connection with an implementation in which the long time exposed image xL1 and the short time exposed image xS4 are composed to produce a signal composite image. The present invention, however, is not limited to the composition of two images, and for composing images with three or more different exposure times, the composition processing in accordance with the aforementioned equation (13) can be repeated in order from the image with the longest exposure time.

In the foregoing second embodiment, the misregistration amount detector 62 extracts four types of feature points P1 to P4 from the long time exposed image xL2 and the short time exposed image xS3, respectively. The present invention, however, is not limited to the four types of feature points, but essentially, plural types of feature points can be extracted from the images.

Figure 29:
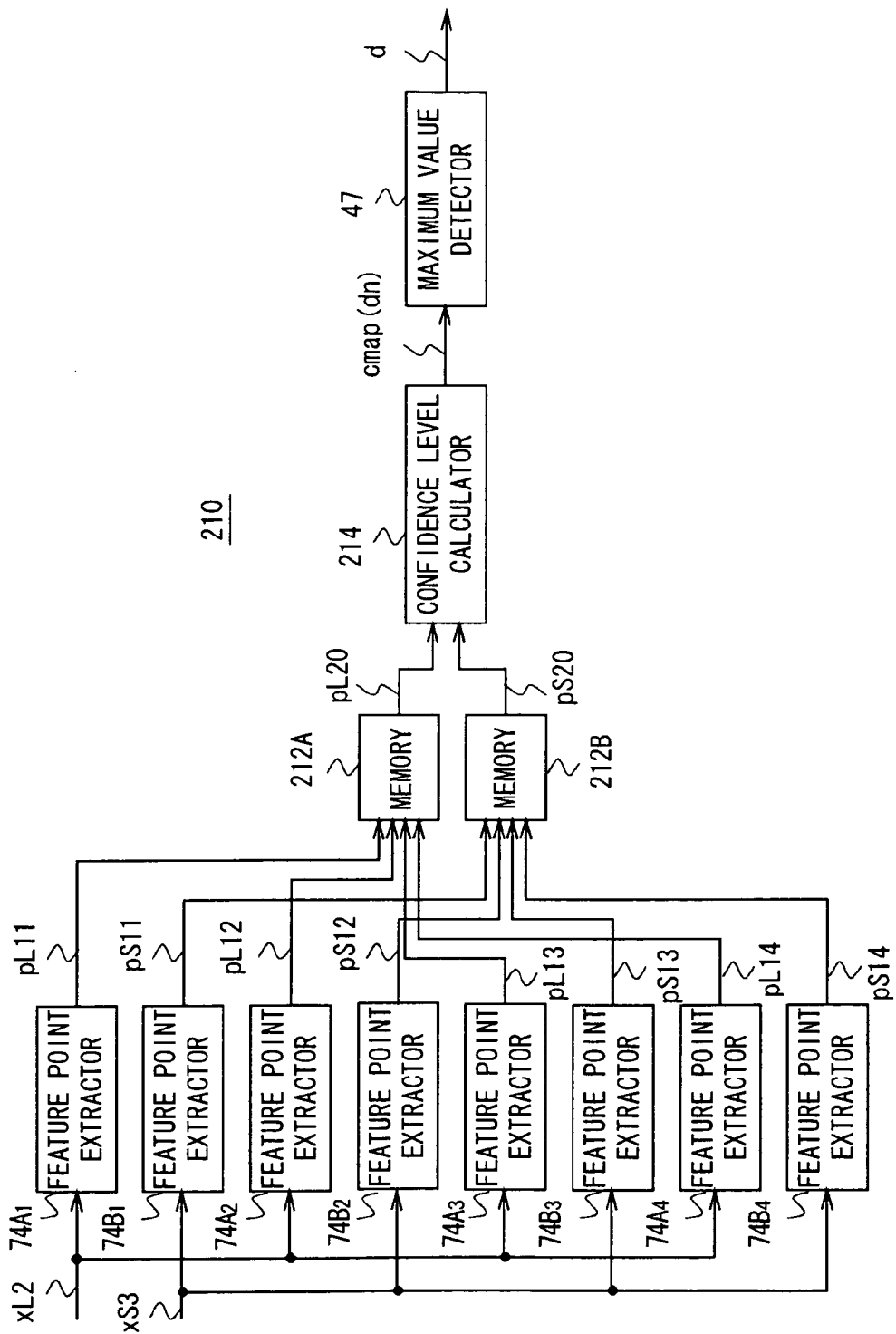
FIG. 29 is a block diagram illustrating the configuration of a misregistration amount detector according to another embodiment.

Also, in the foregoing second embodiment, the feature point images pL11 to pL14 and pS11 to pS14 are written into the corresponding memories $66A_1$ to $66A_4$ and $66B_1$ to $66B_4$, respectively. The present invention, however, is not limited to such a manner of writing the feature point images. Alternatively, as is the case of a misregistration amount detector 210 illustrated in FIG. 29, feature point images pL11 to pL14 sent from feature point extractors $74A_1$ to $74A_4$ can be written into a memory 212A, while feature point images pS11 to pS14 sent from feature point extractors $74B_1$ to $74B_4$ can be written into a memory 212B to produce multi-value feature point extraction images pL20, pS20, in which a pixel can take a value from zero to three, and the feature point extraction images pL20, pS20 are supplied to the confidence level calculator 214 to detect the amount of misregistration.

Further, while in the foregoing fourth embodiment, the luminance separators 124, 125 are provided previous to the limiter 18 and the gain corrector 21, respectively, the present invention is not limited to this configuration. Alternatively, when a zero-cross point extracted by the feature point extractor 30A shown in FIG. 8 is used as the feature point, a filter which additionally has the characteristic of removing or reducing the modulation introduced by a color filter can be used in place of the second-order differentiation type filter 35 to omit the luminance separators 124, 125.

Also, while in the foregoing fourth embodiment, the complementary color diced filter is placed in front of the CCD 122, the present invention is not limited to the placement of the diced filter, but a variety of other color filters can be placed in front of the CCD 112, such as a primary color stripe filter, in which case, appropriate interpolation processing can be performed in accordance with the arrangement of placed color filters.

Figures 1, 30:
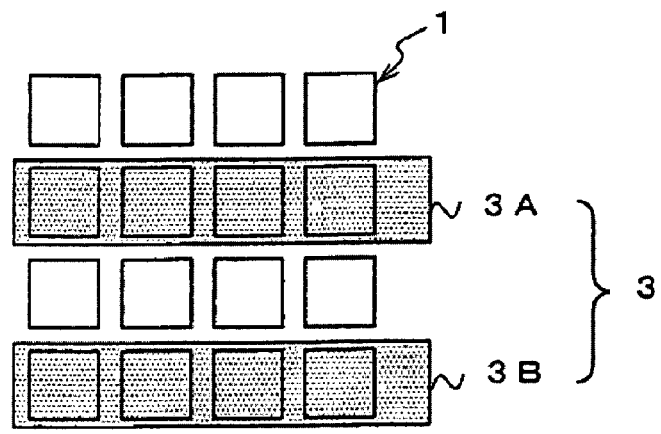
FIG. 1 is a schematic diagram used for explaining exposure amount control based on spatial division.
FIG. 30 is a schematic diagram used for explaining an example of a color filter arrangement in a single-plate color camera.
Figure 2:
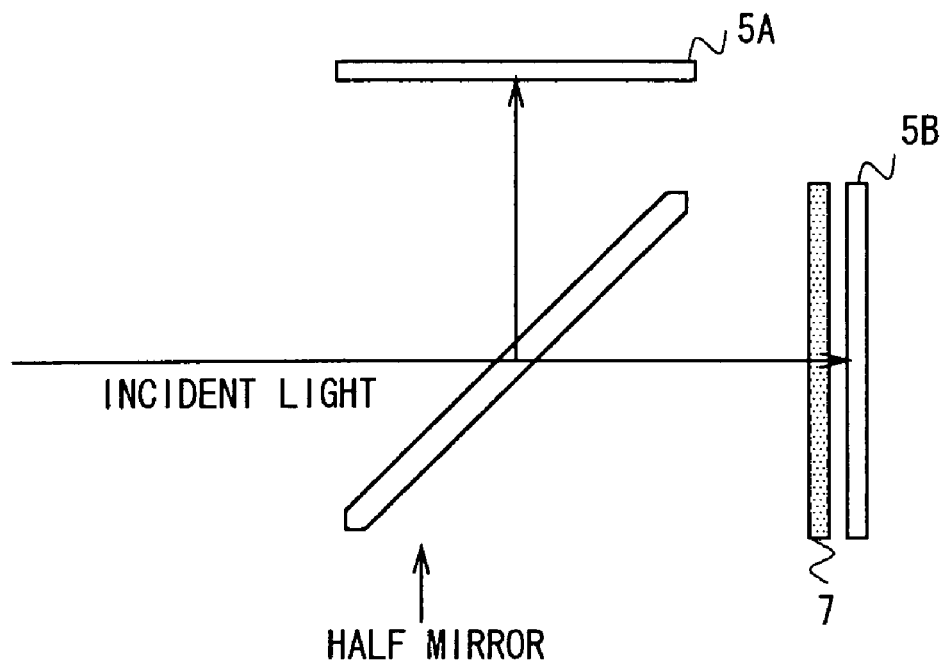
FIG. 2 is a schematic diagram used for explaining exposure amount control using a multi-plate imager device.
Figure 3:
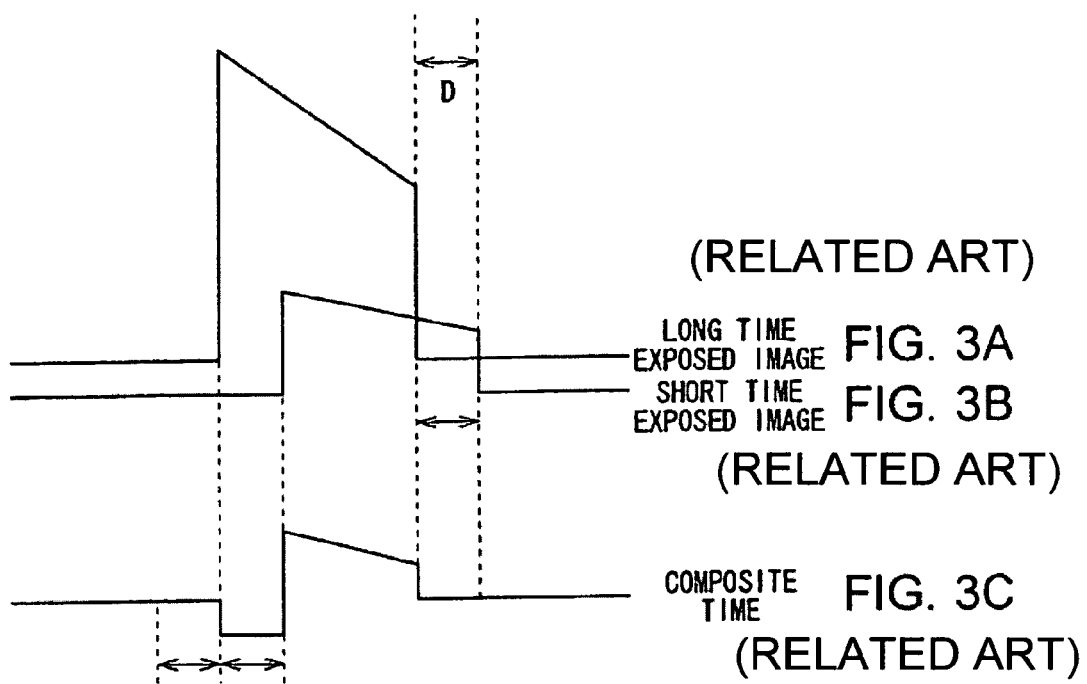
FIGS. 3A, 3B and 3C are schematic diagrams used for explaining how misregistration occurs.

Further, while in the foregoing fourth embodiment, the misregistration corrector 23 performs the interpolation processing to eliminate failed correspondence in color, the present invention is not limited to such an approach of elimination. Alternatively, misregistration amount candidates can be limited to eliminate failed correspondence in color due to the misregistration correction. More specifically, assuming that repeating periods in a color filter array in the horizontal direction and the vertical direction are Th, Tv, respectively, the value possibly taken by a misregistration amount candidate dn=(dnx,dny) is limited by the following equation:

$$dnx=Th \times m$$

$$dny=Tv \times m \quad (27)$$

where m is an arbitrary integer value. A misregistration amount d detected by this limitation is an integer multiple of the repeating period of the color filter, so that the failed correspondence in color can be eliminated. For example, when a color filter as shown in FIG. 30 is employed, it is possible to detect the misregistration amount in units of two pixels both in the horizontal direction and the vertical direction.

Further, while the foregoing first and fourth embodiments have been described for a video camera to which the present invention is applied, the present invention is not limited to the video camera but can be widely applied to a variety of other apparatus equipped with an imager device such as a still camera, a surveillance camera, a car-equipped camera, and so on.

According to the present invention as described above, a misregistration amount of each of images except for a reference image is detected with respect to the reference image, misregistration of each of the images except for the reference image is corrected with respect to the reference image based on the misregistration amount, and then the reference image is composed with each of misregistration corrected images other than the reference image, thereby making it possible to avoid a degraded image quality which would otherwise be produced when a plurality of images are composed without correction, and consequently produce a natural composite image corresponding to an object to be imaged.

While there has been described in connection with the preferred embodiments of the invention, it will be obvious to those skilled in the art that various changes and modifications may be aimed, therefore, to cover in the appended claims all such changes and modifications as fall within the true sprit and scope of the invention.

What is claimed is:

1. An image capturing apparatus for capturing a plurality of images with different amounts of exposure to compose said images into a single composite image, said image capturing apparatus comprising:
   integrating means for integrating pixel values for each pixel train in the horizontal direction to produce an array in the vertical direction, and for integrating pixel values for each pixel train in the vertical direction to produce a data array in the horizontal direction, for each of said plurality of images;
   misregistration amount detecting means for detecting the amounts of misregistration of respective images except for a reference image using feature points of images, said reference image selected from said plurality of images, with respect to said reference image;
   wherein the misregistration amount detecting means comprises a feature point extracting means for extracting feature points from said reference image and respective images except for said reference image, respectively;
   wherein said feature point extracting means extracts feature points in said reference image and feature points in each of the images except for said reference image based on the respective data arrays in the vertical and horizontal directions;
   misregistration correcting means for correcting the misregistration of the respective images except for said reference image with respect to said reference image based on said misregistration amounts; and
   image composing means for composing said reference image and all of the respective misregistration corrected images except for said reference images.

2. The image capturing apparatus according to claim 1, wherein said misregistration amount detecting means comprises:
   confidence level calculating means for calculating a confidence level for each of the images except for said reference image as said misregistration amount for each of a plurality of previously provided misregistration amount candidates, based on a positional relationship of the feature points in said reference image and the feature points in the respective images except for said reference image; and
   maximum value detecting means for detecting said misregistration amount candidate which presents a maximum confidence level within said misregistration amount candidates as said misregistration amount in each of the images except for said reference image.

3. The image capturing apparatus according to claim 2, wherein
   said confidence level calculating means corrects misregistration between a feature point in said reference image and a feature point in an image except for said reference image using said misregistration amount candidate, and counts the number of positions of said feature points which correspond to each other to calcuculate said confidence level, thereby calculating said confidence level in each of said plurality of misregistration amount candidates.

4. The image capturing apparatus according to claim 2, wherein
   said feature point extracting means extracts plural types of feature points from said reference image and each of the images except for said reference image; and
   said confidence level calculating means calculates the confidence level for each of the images except for said reference images as said misregistration amount for each of said plurality of previously provided misregistration amount candidates based on a positional relationship of said plural types of feature points extracted from said reference image and said plural types of feature points extracted from each of the images except for said reference image.

5. The image device according to claim 2, wherein
   said feature point is a pixel which forms an edge at which a pixel value presents an abrupt change.

6. The image capturing apparatus according to claim 2, wherein
   said feature point extracting means extracts feature points in said reference image and feature points in each of the images except for said reference image based on luminance information included in said plurality of images.

7. An imaging method for capturing a plurality of images with different amounts of exposure to compose said images into a single composite image, said imaging method comprising the steps of:
   integrating pixel values for each pixel train in the horizontal direction to produce an array in the vertical direction, and for integrating pixel values for each pixel train in the vertical direction to produce a data array in the horizontal direction, for each of said plurality of images;
   detecting the amounts of misregistration of respective images except for a reference image, said reference image selected from said plurality of images, with respect to said reference image;
   extracting feature points from said reference image and respective images except for said reference image, respectively, based on the respective data arrays in the vertical and horizontal directions;
   correcting the misregistration of the respective images except for said reference image with respect to said reference image based on said misregistration amounts; and
   composing said reference image and all of the respective misregistration corrected images except for said reference images.

8. The imaging method according to claim 7, comprising the steps of:
   calculating a confidence level for each of the images except for said reference image as said misregistration amount for each of a plurality of previously provided misregistration amount candidates, based on a positional relationship of the feature points in said reference image and the feature points in the respective images except for said reference image; and
   detecting said misregistration amount candidate which presents a maximum confidence level within said misregistration amount candidates as said misregistration amount in each of the images except for said reference image.

9. The imaging method according to claim 8, wherein misregistration between a feature point in said reference image and a feature point in an image except for said reference image is corrected by using said misregistration amount candidate, and the number of positions of said feature points which correspond to each other is counted to calculate said confidence level, thereby said confidence level in each of said plurality of misregistration amount candidates is calculated.

10. The imaging method according to claim 8, comprising the steps of:
   extracting plural types of feature points from said reference image and each of the images except for said reference image; and
   calculating the confidence level for each of the images except for said reference image as said misregistration amount for each of said plurality of previously provided misregistration amount candidates based on a positional relationship of said plural types of feature points extracted from said reference image and said plural types of feature points extracted from each of the images except for said reference image.

11. The imaging method according to claim 8, wherein said feature point is a pixel which forms an edge at which a pixel value presents an abrupt change.

12. The imaging method according to claim 8, comprising the step of:
   extracting feature points in said reference image and feature points in each of the images except for said reference image based on luminance information included in said plurality of images.

* * * * *